US012707401B2

(12) United States Patent
Abedini et al.

(10) Patent No.: US 12,707,401 B2
(45) Date of Patent: Aug. 11, 2026

(54) TECHNIQUES FOR ADAPTING BROADCAST SIGNALS FOR NETWORK ENERGY SAVINGS AND COVERAGE ENHANCEMENT

(71) Applicant: QUALCOMM Incorporated, San Diego, CA (US)

(72) Inventors: Navid Abedini, Basking Ridge, NJ (US); Junyi Li, Greentown, PA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 18/623,795

(22) Filed: Apr. 1, 2024

(65) Prior Publication Data

US 2025/0310898 A1 Oct. 2, 2025

(51) Int. Cl.
*H04W 52/32* (2009.01)
*H04W 48/10* (2009.01)

(52) U.S. Cl.
CPC ......... *H04W 52/322* (2013.01); *H04W 48/10* (2013.01)

(58) Field of Classification Search
CPC ............................ H04W 52/322; H04W 48/10
See application file for complete search history.

(56) References Cited

U.S. PATENT DOCUMENTS

2022/0240163 A1* 7/2022 Choi ..................... H04W 76/28
2022/0338181 A1* 10/2022 Tabet ..................... H04W 48/12
2023/0328769 A1* 10/2023 Khirallah ............ H04W 72/542
370/329

FOREIGN PATENT DOCUMENTS

WO WO-2024035018 A1 * 2/2024 ............... H04L 5/00

* cited by examiner

*Primary Examiner* — Curtis A Kuntz
(74) *Attorney, Agent, or Firm* — QUALCOMM Incorporated

(57) ABSTRACT

Methods, systems, and devices for wireless communications are described. In some cases, a user equipment (UE) may monitor, from a network entity within a time window, for a first broadcast signal that includes first information, where the first broadcast signal is broadcast in accordance with a first configuration associated with a first set of transmission parameters. Further, the UE may fail to receive the first broadcast signal during the time window and, as such, may transmit, to the network entity after the time window, a request for transmission of a second broadcast signal that includes the first information. In such cases, the request may be that the second broadcast signal be broadcast in accordance with a second configuration associated with a second set of transmission parameters. Thus, the UE may receive the first information through receipt of the second broadcast signal instead of receipt of the first broadcast signal.

20 Claims, 13 Drawing Sheets

Monitor, from a network entity and within a time window, for a first broadcast signal that includes first information, where the first broadcast signal is broadcast in accordance with a first configuration associated with a first set of transmission parameters, where the first set of transmission parameters includes a first transmission periodicity, a first link budget, or both

1205

Transmit, to the network entity after the time window and based on the monitoring, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both

1210

Receive the first information through receipt of the second broadcast signal instead of receipt of the first broadcast signal, based on transmission of the request

1215

1200

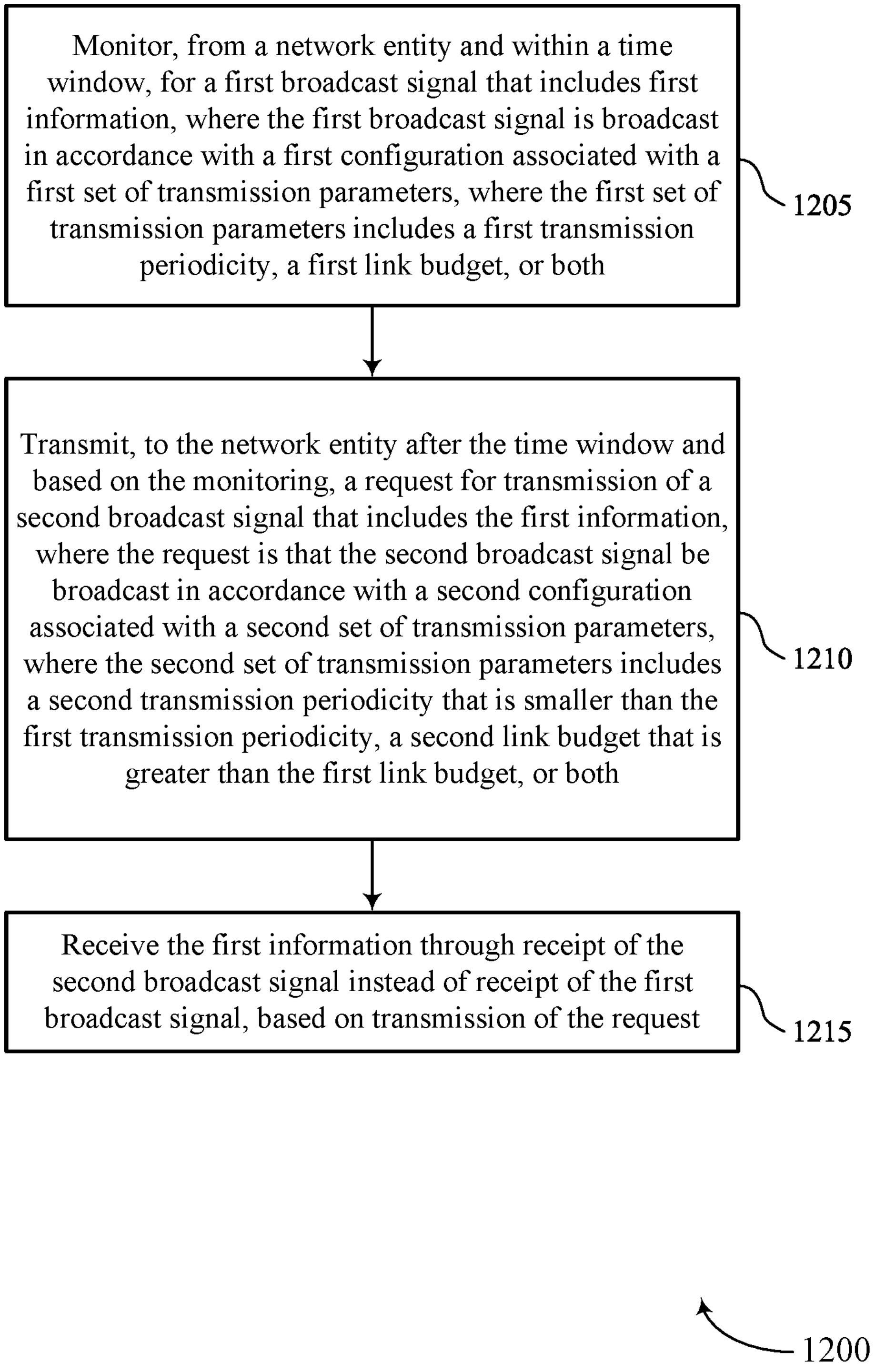

FIG. 12

Output, during a time window, a first broadcast signal that includes first information, where the first broadcast signal is broadcast in accordance with a first configuration associated with a first set of transmission parameters, where the first set of transmission parameters includes a first transmission periodicity, a first link budget, or both

1305

Obtain, after the time window, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both

1310

Output the first information through transmission of the second broadcast signal based on obtaining the request

1315

1300

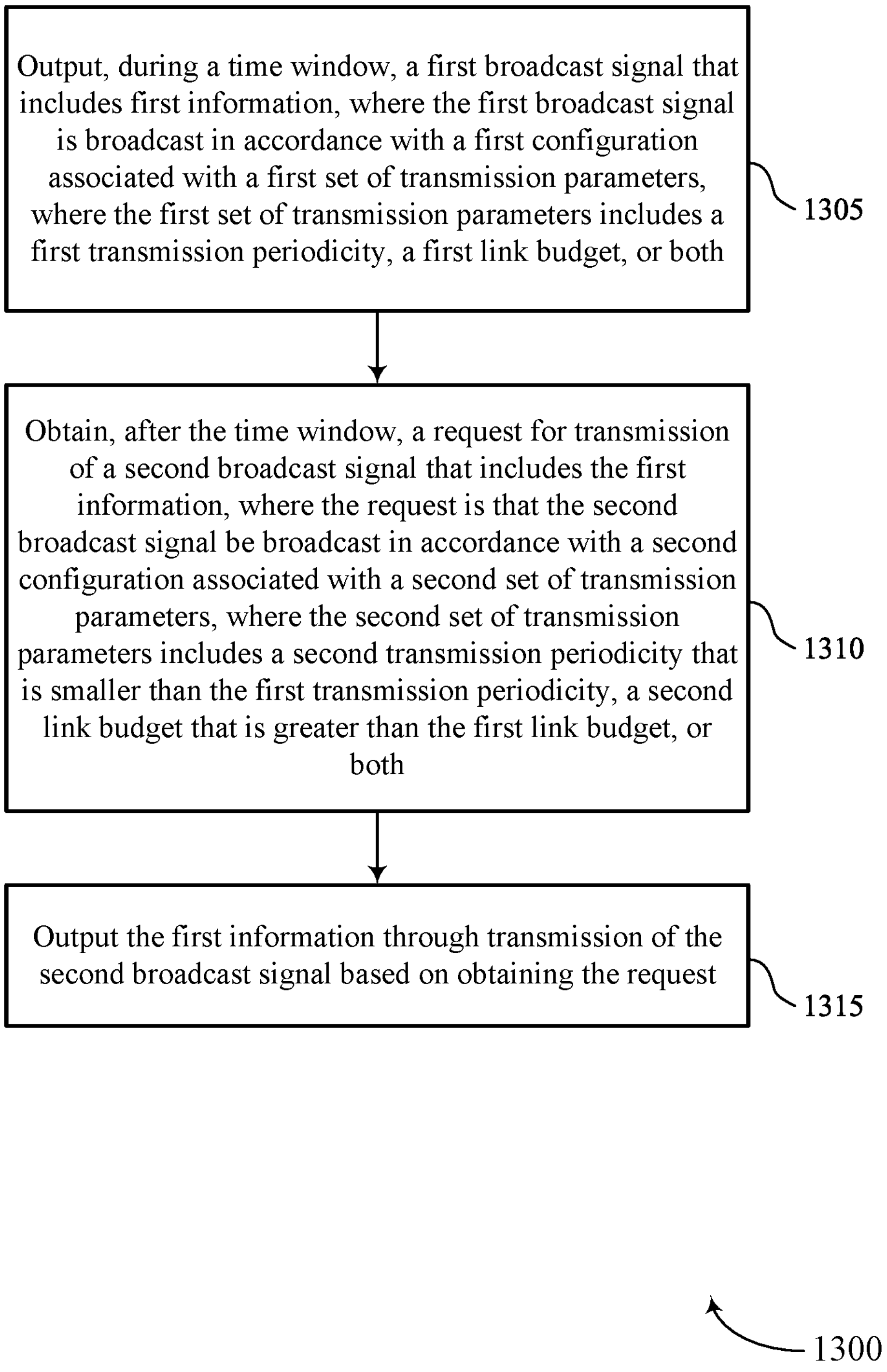

FIG. 13

TECHNIQUES FOR ADAPTING BROADCAST SIGNALS FOR NETWORK ENERGY SAVINGS AND COVERAGE ENHANCEMENT

FIELD OF TECHNOLOGY

The following relates to wireless communications, including techniques for adapting broadcast signals for network energy savings and coverage enhancement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for adapting broadcast signals for network energy savings and coverage enhancement. Generally, the techniques described herein may enable a network entity to increase a link budget, increase a frequency of transmission, or both, associated with a broadcast signal based on a request (e.g., demand) from a user equipment (UE). For example, a UE may monitor, from a network entity within a time window, for a first broadcast signal that includes first information. In such cases, the first broadcast signal may be broadcast in accordance with a first configuration associated with a first set of transmission parameters, where the first set of transmission parameters comprises a first transmission periodicity, a first link budget, or both. In some cases, the UE may fail to receive the first broadcast signal during the time window and, as such, may transmit, to the network entity after the time window, a request for transmission of a second broadcast signal that includes the first information. In such cases, the request may be that the second broadcast signal be broadcast in accordance with a second configuration associated with a second set of transmission parameters, where the second set of transmission parameters comprises a second transmission periodicity that is smaller than the first transmission periodicity, a second link budget that is greater than the first link budget, or both. Thus, the UE may receive the first information through receipt of the second broadcast signal instead of receipt of the first broadcast signal based on transmission of the request.

A method for wireless communications by a UE is described. The method may include monitoring, from a network entity and within a time window, for a first broadcast signal that includes first information, where the first broadcast signal is broadcast in accordance with a first configuration associated with a first set of transmission parameters, where the first set of transmission parameters includes a first transmission periodicity, a first link budget, or both, transmitting, to the network entity after the time window and based on the monitoring, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both, and receiving the first information through receipt of the second broadcast signal instead of receipt of the first broadcast signal, based on transmission of the request.

A UE for wireless communications is described. The UE may include one or more memories storing processor executable code, and one or more processors coupled with the one or more memories. The one or more processors may individually or collectively be operable to execute the code to cause the UE to monitor, from a network entity and within a time window, for a first broadcast signal that includes first information, where the first broadcast signal is broadcast in accordance with a first configuration associated with a first set of transmission parameters, where the first set of transmission parameters includes a first transmission periodicity, a first link budget, or both, transmit, to the network entity after the time window and based on the monitoring, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both, and receive the first information through receipt of the second broadcast signal instead of receipt of the first broadcast signal, based on transmission of the request.

Another UE for wireless communications is described. The UE may include means for monitoring, from a network entity and within a time window, for a first broadcast signal that includes first information, where the first broadcast signal is broadcast in accordance with a first configuration associated with a first set of transmission parameters, where the first set of transmission parameters includes a first transmission periodicity, a first link budget, or both, means for transmitting, to the network entity after the time window and based on the monitoring, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both, and means for receiving the first information through receipt of the second broadcast signal instead of receipt of the first broadcast signal, based on transmission of the request.

A non-transitory computer-readable medium storing code for wireless communications is described. The code may include instructions executable by one or more processors to monitor, from a network entity and within a time window, for a first broadcast signal that includes first information, where the first broadcast signal is broadcast in accordance with a first configuration associated with a first set of transmission parameters, where the first set of transmission parameters includes a first transmission periodicity, a first link budget, or both, transmit, to the network entity after the time window and based on the monitoring, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both, and receive the first information through receipt of the second broadcast signal instead of receipt of the first broadcast signal, based on transmission of the request.

Some examples of the method, UEs, and non-transitory computer-readable medium described herein may further include operations, features, means, or instructions for receiving, prior to the time window, a third broadcast signal associated with a third link budget that may be greater than at least the first link budget, where monitoring for the first broadcast signal may be based on receiving the third broadcast signal.

In some examples of the method, UEs, and non-transitory computer-readable medium described herein, the third broadcast signal may be a SSB message or a RMSI PDCCH.

Some examples of the method, UEs, and non-transitory computer-readable medium described herein may further include operations, features, means, or instructions for receiving a first control message indicating configuration information associated with the third broadcast signal, one or more resources for reception of the third broadcast signal, or both.

In some examples of the method, UEs, and non-transitory computer-readable medium described herein, the first control message may be transmitted periodically, semi-persistently, or dynamically.

In some examples of the method, UEs, and non-transitory computer-readable medium described herein, the one or more resources for reception of the third broadcast signal correspond to one or more resources for reception of the first broadcast signal, one or more resources for transmission of the request, or both.

In some examples of the method, UEs, and non-transitory computer-readable medium described herein, one or more resources for transmission of the request may be activated based on reception of the third broadcast signal.

In some examples of the method, UEs, and non-transitory computer-readable medium described herein, the second configuration, one or more resources associated with transmission of the request, or both, may be shared with one or more additional signals.

Some examples of the method, UEs, and non-transitory computer-readable medium described herein may further include operations, features, means, or instructions for receiving a first control message indicating the second configuration, one or more resources for transmission of the request, one or more resources for reception of the first broadcast signal, or any combination thereof.

In some examples of the method, UEs, and non-transitory computer-readable medium described herein, the first control message may be transmitted dynamically or semi-statically.

Some examples of the method, UEs, and non-transitory computer-readable medium described herein may further include operations, features, means, or instructions for receiving a first control message indication one or more conditions associated with transmitting the request, where transmitting the request may be based on satisfying at least one of the one or more conditions.

In some examples of the method, UEs, and non-transitory computer-readable medium described herein, the one or more conditions includes failing to receive the first broadcast signal within the time window, failing to receive the first broadcast signal within one or more consecutive time time windows, or both.

Some examples of the method, UEs, and non-transitory computer-readable medium described herein may further include operations, features, means, or instructions for receiving a feedback message in response to the request, where the feedback message indicates whether the request may be granted.

In some examples of the method, UEs, and non-transitory computer-readable medium described herein, the feedback message further indicates one or more resources for reception of the second broadcast signal, the second configuration, or both, based on the request indicating that the request may be granted.

In some examples of the method, UEs, and non-transitory computer-readable medium described herein, the request further indicates an identity of the UE, an estimated link budget, an estimated pathloss, a suggested configuration, one or more acquired RVs, one or more requested RVs, or any combination thereof.

Some examples of the method, UEs, and non-transitory computer-readable medium described herein may further include operations, features, means, or instructions for transmitting, prior to the time window, a second request for transmission of the first broadcast signal, where monitoring for the first broadcast signal may be based on transmitting the second request.

In some examples of the method, UEs, and non-transitory computer-readable medium described herein, the first broadcast signal may be transmitted in accordance with the first transmission periodicity.

In some examples of the method, UEs, and non-transitory computer-readable medium described herein, the first link budget may be associated with a first quantity of repetitions, a first aggregation level, a first MCS, or any combination thereof, the second link budget may be associated with a second quantity of repetitions, a second aggregation level, a second MCS, or any combination thereof, and the first quantity of repetitions may be less than the second quantity of repetitions, the first aggregation level may be greater than the second aggregation level, the first MCS may be greater than the second MCS, or any combination thereof.

A method for wireless communications by a network entity is described. The method may include outputting, during a time window, a first broadcast signal that includes first information, where the first broadcast signal is broadcast in accordance with a first configuration associated with a first set of transmission parameters, where the first set of transmission parameters includes a first transmission periodicity, a first link budget, or both, obtaining, after the time window, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both, and outputting the first information through transmission of the second broadcast signal based on obtaining the request.

A network entity for wireless communications is described. The network entity may include one or more memories storing processor executable code, and one or more processors coupled with the one or more memories. The one or more processors may individually or collectively be operable to execute the code to cause the network entity to output, during a time window, a first broadcast signal that includes first information, where the first broadcast signal is broadcast in accordance with a first configuration associated with a first set of transmission parameters, where the first set of transmission parameters includes a first transmission periodicity, a first link budget, or both, obtain, after the time window, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both, and output the first information through transmission of the second broadcast signal based on obtaining the request.

Another network entity for wireless communications is described. The network entity may include means for outputting, during a time window, a first broadcast signal that includes first information, where the first broadcast signal is broadcast in accordance with a first configuration associated with a first set of transmission parameters, where the first set of transmission parameters includes a first transmission periodicity, a first link budget, or both, means for obtaining, after the time window, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both, and means for outputting the first information through transmission of the second broadcast signal based on obtaining the request.

A non-transitory computer-readable medium storing code for wireless communications is described. The code may include instructions executable by one or more processors to output, during a time window, a first broadcast signal that includes first information, where the first broadcast signal is broadcast in accordance with a first configuration associated with a first set of transmission parameters, where the first set of transmission parameters includes a first transmission periodicity, a first link budget, or both, obtain, after the time window, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both, and output the first information through transmission of the second broadcast signal based on obtaining the request.

Some examples of the method, network entities, and non-transitory computer-readable medium described herein may further include operations, features, means, or instructions for transmitting, prior to the time window, a third broadcast signal associated with a third link budget that may be greater than at least the first link budget, where monitoring for the first broadcast signal may be based on receiving the third broadcast signal.

In some examples of the method, network entities, and non-transitory computer-readable medium described herein, the third broadcast signal may be a SSB message or a RMSI PDCCH.

Some examples of the method, network entities, and non-transitory computer-readable medium described herein may further include operations, features, means, or instructions for transmitting a first control message indicating configuration information associated with the third broadcast signal, one or more resources for reception of the third broadcast signal, or both.

In some examples of the method, network entities, and non-transitory computer-readable medium described herein, the first control message may be transmitted periodically, semi-persistently, or dynamically.

In some examples of the method, network entities, and non-transitory computer-readable medium described herein, the one or more resources for reception of the third broadcast signal correspond to one or more resources for reception of the first broadcast signal, one or more resources for transmission of the request, or both.

In some examples of the method, network entities, and non-transitory computer-readable medium described herein, one or more resources for transmission of the request may be activated based on transmission of the third broadcast signal.

In some examples of the method, network entities, and non-transitory computer-readable medium described herein, the second configuration, one or more resources associated with transmission of the request, or both, may be shared with one or more additional signals.

Some examples of the method, network entities, and non-transitory computer-readable medium described herein may further include operations, features, means, or instructions for transmitting a first control message indicating the second configuration, one or more resources for transmission of the request, one or more resources for reception of the first broadcast signal, or any combination thereof.

In some examples of the method, network entities, and non-transitory computer-readable medium described herein, the first control message may be transmitted dynamically or semi-statically.

Some examples of the method, network entities, and non-transitory computer-readable medium described herein may further include operations, features, means, or instructions for transmitting a first control message indication one or more conditions associated with transmitting the request, where receiving the request may be based on satisfying at least one of the one or more conditions.

In some examples of the method, network entities, and non-transitory computer-readable medium described herein, the one or more conditions includes a UE failing to receive the first broadcast signal within the time window, the UE failing to receive the first broadcast signal within one or more consecutive time time windows, or both.

Some examples of the method, network entities, and non-transitory computer-readable medium described herein may further include operations, features, means, or instructions for transmitting a feedback message in response to the request, where the feedback message indicates whether the request may be granted.

In some examples of the method, network entities, and non-transitory computer-readable medium described herein, the feedback message further indicates one or more resources for reception of the second broadcast signal, the second configuration, or both, based on the request indicating that the request may be granted.

In some examples of the method, network entities, and non-transitory computer-readable medium described herein, the request further indicates an identity of a UE, an estimated link budget, an estimated pathloss, a suggested configuration, one or more acquired RVs, one or more requested RVs, or any combination thereof.

Some examples of the method, network entities, and non-transitory computer-readable medium described herein may further include operations, features, means, or instructions for receiving, prior to the time window, a second request for transmission of the first broadcast signal, where monitoring for the first broadcast signal may be based on transmitting the second request.

In some examples of the method, network entities, and non-transitory computer-readable medium described herein, the first broadcast signal may be transmitted in accordance with the first transmission periodicity.

In some examples of the method, network entities, and non-transitory computer-readable medium described herein, the first link budget may be associated with a first quantity of repetitions, a first aggregation level, a first MCS, or any combination thereof, the second link budget may be associated with a second quantity of repetitions, a second aggregation level, a second MCS, or any combination thereof, and the first quantity of repetitions may be less than the second quantity of repetitions, the first aggregation level may be greater than the second aggregation level, the first MCS may be greater than the second MCS, or any combination thereof.

BRIEF DESCRIPTION OF THE DRAWINGS

FIGS. 12 and 13 show flowcharts illustrating methods that support techniques for adapting broadcast signals for network energy savings and coverage enhancement in accordance with one or more aspects of the present disclosure.

DETAILED DESCRIPTION

Figure 1:
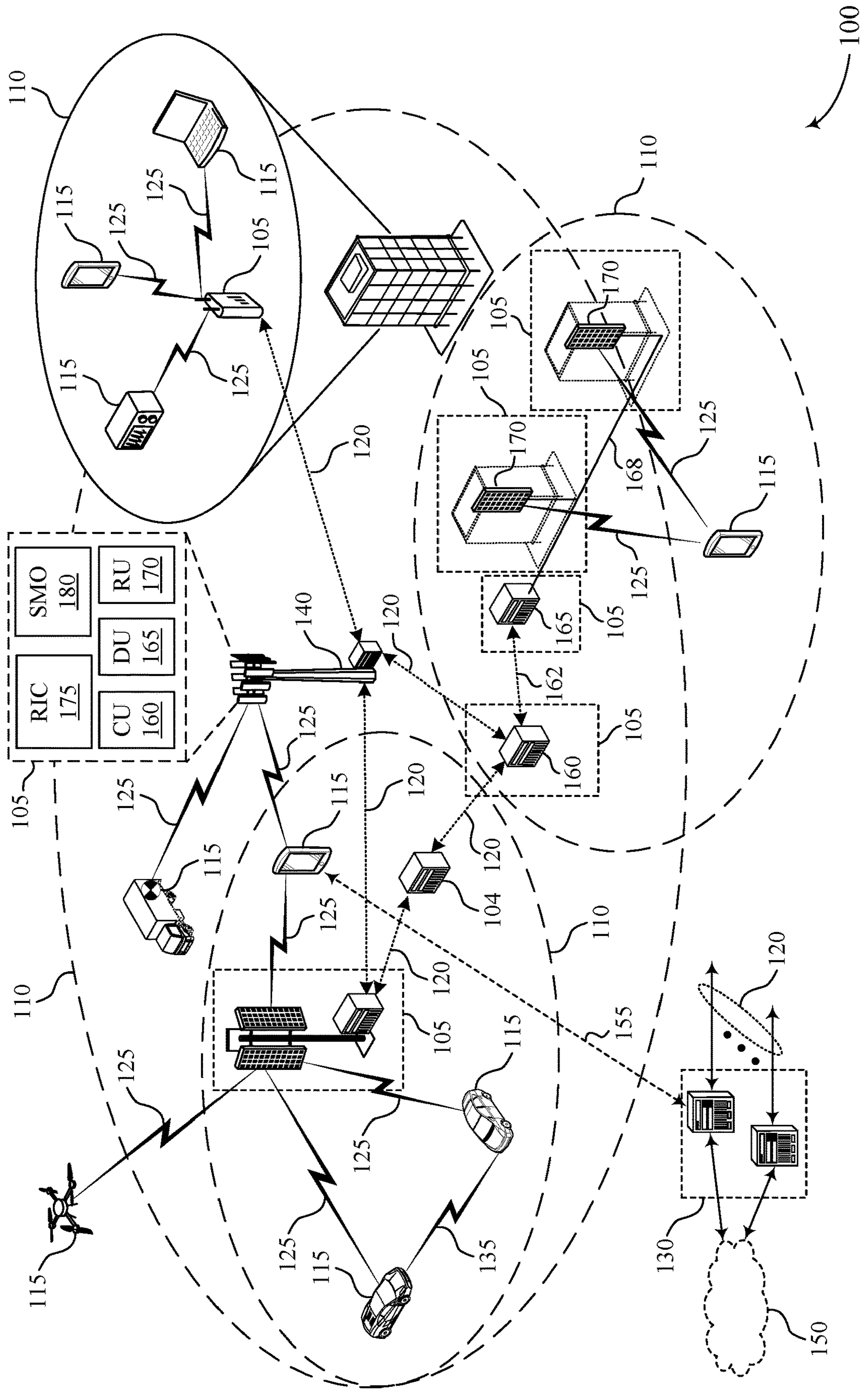
FIG. 1 shows an example of a wireless communications system that supports techniques for adapting broadcast signals for network energy savings and coverage enhancement in accordance with one or more aspects of the present disclosure.

In some wireless communications systems, a cell (e.g., a network entity) may periodically broadcast system information blocks (SIBs) indicating configuration information associated with the cell to enable a user equipment (UE) to access the cell or to camp on the cell. However, broadcasting SIBs periodically may result in increased resource utilization and power consumption for the cell. For example, there may be durations during which it is unlikely that UEs may attempt to access the cell (e.g., the middle of the night), such that SIBs broadcasted during that duration may result in unnecessary resource utilization and power consumption for the cell. As such, in some cases, a cell may support on demand SIB transmissions in which the cell may not broadcast SIBs periodically (e.g., or may transmit SIBs at an infrequent periodicity) and instead may broadcast SIBs in response to requests (e.g., demands) from UEs, which may be referred to as uplink wake up signals (UL-WUSs). In either case, to support enhanced coverage, the cell may broadcast the SIBs in accordance with a first link budget (e.g., a high link budget), where the first link budget enables UEs at a boundary of a coverage area of the cell to receive the SIB. However, some UEs may not be located at (e.g., or within proximity of) the boundary of the coverage area of the cell (e.g., the UEs may be located closer to the cell), such that the UEs may be capable of receiving SIBs in accordance with a lower link budget than the first link budget. Thus, the cell broadcasting SIBs in accordance with the first link budget may result in increased (e.g., unnecessary) power consumption (e.g., for some UEs).

Accordingly, techniques described herein may enable a cell to broadcast, periodically or on demand, a first SIB (e.g., remaining minimum system information (RMSI)) in accordance with a low link budget (e.g., a low link budget signal) and broadcast, on demand based on a request from a UE, a second SIB in accordance with a high link budget (e.g., high link budget signal), where the first SIB and the second SIB indicate the same information. For example, the cell may broadcast a first configuration signal in accordance with a high link budget. In such cases, the first configuration signal may indicate (e.g., implicitly) to UEs that the cell supports on demand high link budget SIB transmissions. Thus, a UE may monitor for the first SIB, broadcast in accordance with the low link budget, and, if the UE does not receive the first SIB, may transmit a request for the cell to broadcast the second SIB in accordance with the high (e.g., higher) link budget.

Additionally, or alternatively, regardless of link budget, the cell may broadcast a first SIB in accordance with a first periodicity (e.g., long periodicity, every 160 ms, every 320 ms). However, a UE may be configured to monitor for the first SIB during a time window that is shorter than the first periodicity (e.g., 40 ms, 80 ms). As such, if the UE monitors for the first SIB during the time window and does not receive the first SIB during the time window, the UE may transmit, after the time window, a request for the cell to transmit a second SIB in accordance with a second periodicity, shorter than the first periodicity, where the first SIB and the second SIB indicate the same information.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to techniques for adapting broadcast signals for network energy savings and coverage enhancement.

FIG. 1 shows an example of a wireless communications system 100 that supports techniques for adapting broadcast signals for network energy savings and coverage enhancement in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station

140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, the wireless communications system 100 may support cells (e.g., network entities 105) capable of transmitting SIBs in accordance with high link budgets based on requests from UEs 115. For example, the cell may broadcast a first configuration signal in accordance with a high link budget. In such cases, the first configuration signal may indicate (e.g., implicitly) to UEs 115 that the cell supports on demand high link budget SIB transmissions. Thus, a UE 115 may monitor for the first SIB, broadcast in accordance with the low link budget, and, if the UE 115 does not receive the first SIB, may transmit a request for the cell to broadcast the second SIB in accordance with a high (e.g., higher) link budget.

Additionally, or alternatively, regardless of link budget, the cell may broadcast a first SIB in accordance with a first periodicity (e.g., long periodicity, every 160 ms, every 320 ms). However, a UE 115 may be configured to monitor for the first SIB during a time window that is shorter than the first periodicity (e.g., 40 ms, 80 ms). As such, if the UE 115 monitors for the first SIB during the time window and does not receive the first SIB during the time window, the UE 115 may transmit, after the time window, a request for the cell to transmit a second SIB in accordance with a second periodicity, shorter than the first periodicity, where the first SIB and the second SIB indicate the same information.

Figure 2:
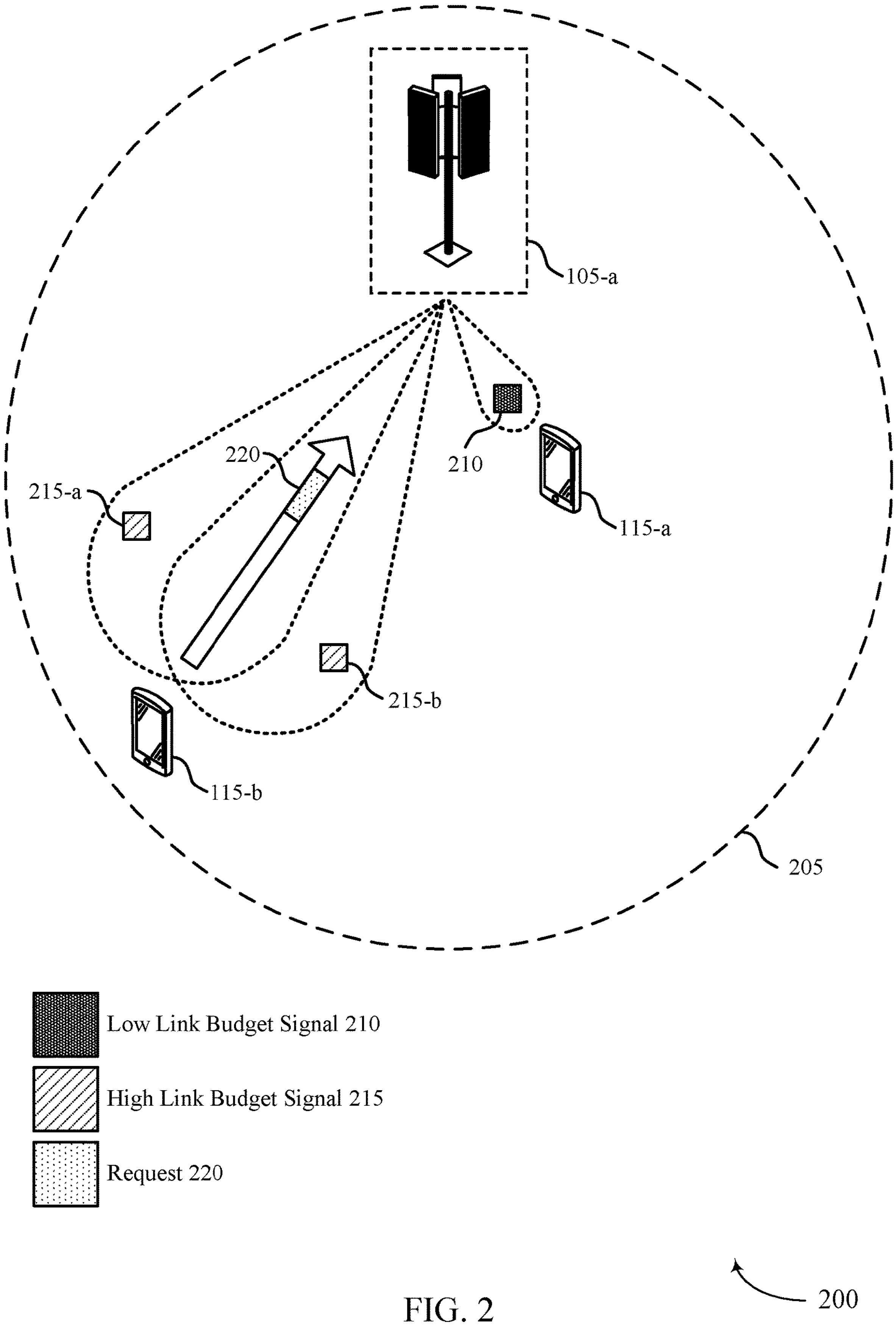
FIG. 2 shows an example of a wireless communications system that supports techniques for adapting broadcast signals for network energy savings and coverage enhancement in accordance with one or more aspects of the present disclosure.

FIG. 2 shows an example of a wireless communications system 200 that supports techniques for adapting broadcast signals for network energy savings and coverage enhancement in accordance with one or more aspects of the present disclosure. In some cases, the wireless communications system 200 may implement or be implemented by aspects of the wireless communications system 100. For example, the wireless communications system 200 may include one or more UEs 115 (e.g., a UE 115-*a* and a UE 115-*b*) and one or more network entities 105 (e.g., a network entity 105-*a*), which may be examples of the corresponding devices as described herein.

In some wireless communications systems, such as the wireless communications system 200, a network entity 105-*a* (e.g., a cell) may periodically broadcast an information signal, such as SIBs (e.g., SIB1), RMSI, or the like thereof, indicating configuration information associated with the network entity 105-*a* to enable a UE 115, such as a UE 115-*a* or a UE 115-*b*, to access the network entity 105-*a* or to camp on the network entity 105-*a*. That is, a UE 115 may enter a coverage area 205 of the network entity 105-*a* and may monitor for the information signal, such that when the UE 115 receives the information signal, the UE 115 may access or camp on the network entity 105-*a* based on the configuration information indicated via the information signal.

However, in some cases, broadcasting information signals periodically may result in increased resource utilization and power consumption for the network entity 105-*a*. For example, there may be durations during which it is unlikely that UEs 115 may attempt to access the network entity 105-*a* (e.g., the middle of the night), such that information signals broadcast during that duration may result in unnecessary (e.g., wasted) resource utilization and power consumption for the network entity 105-*a*. As such, the network entity 105-*a* may support on demand information transmissions (e.g., on-demand SIB1) to support network energy saving. That is, the network entity 105-*a* (e.g., in a network energy saving state) may not broadcast information signals (e.g., SIB) periodically (e.g., or may transit SIBs at an infrequent periodicity, longer periodicity, periodicity satisfying a threshold) and may broadcast information signals in response to requests 220 from UEs 115, which may be referred to as UL-WUSs. In other words, a UE 115 may enter the coverage area 205 of the network entity 105-*a* and may transmit an UL-WUS to the network entity 105-*a* requesting that the network entity 105-*a* broadcast an information signal (e.g., SIB).

In either case (e.g., periodic SIB transmission, on demand SIB transmission, or both), to support coverage enhancements, the network entity 105-*a* may broadcast information signals in accordance with a first link budget (e.g., for a common channel, RMSI physical downlink control channel (PDCCH), RMSI physical downlink shared channel (PDSCH)), where the first link budget (e.g., high link budget) enables UEs 115 at a boundary of the coverage area 205 (e.g., cell-edge UEs 115) to receive the information signals. Additionally, or alternatively, the network entity 105-*a* may transmit multiple repetitions of an information signal (e.g., RMSI PDCCH repetition) to support reception by UEs 115 at the boundary of the coverage area 205.

For example, the UE 115-*a* may be located at a first distance from the network entity 105-*a* (e.g., close to the network entity 105-*a*) in the coverage area 205 and the UE 115-*b* may be located at a second distance the network entity 105-*a* (e.g., far from the network entity 105-*a*, the UE 115-*b* may be a cell-edge UE 115) in the coverage area 205, where the second distance is further from the network entity 105-*a* than the first distance and is near the boundary of the coverage area 205. As such, the UE 115-*a* may be capable of receiving information signals broadcast by the network entity 105-*a* in accordance with a first threshold link budget (e.g., low link budget) and the UE 115-*b* may be capable of receiving information signals broadcast by the network entity 105-*a* in accordance with a second threshold link budget (e.g., high link budget), where the second threshold link budget is higher (e.g., greater) than the first threshold link budget. Thus, to support the UE 115-*b* receiving information signals broadcast by the network entity 105-*a*, the network entity 105-*a* may broadcast information signals (e.g., all information signals) in accordance with the first link budget that is greater than both the first threshold link budget and the second threshold link budget (e.g., because the network entity 105-*a* may not be aware of a position of a given UE 115).

However, as described previously, some UEs 115, such as the UE 115-*a*, may be located closer to the network entity 105-*a* (e.g., within a threshold proximity, not at the boundary of the network entity 105-*a*), such that, in some case (e.g., when the UE 115-*b* is not present), broadcasting information signals (e.g., all information signals) in accordance with the first link budget may result in increased (e.g., inefficient, unnecessary) power consumption. Thus, there may be tension (e.g., a balance) between broadcasting information signals such that all (e.g., or mostly all) UEs 115 in the coverage area 205 may receive the information signal and reducing (e.g., conserving) power consumption of the network entity 105-*a* (e.g., saving network power).

Accordingly, techniques described herein may enable the network entity 105-*a* to broadcast, partially or on demand, first information (e.g., SSB, RMSI PDCCH, etc.) as a low link budget signal 210 (e.g., in accordance with a first link budget below a threshold link budget, nominal link budget, low link budget) and broadcast, on demand based on a request 220 from a UE 115, the first information as a high link budget signal 215-*a* (e.g., in accordance with a second link budget above the threshold link budget, high link budget), where the high link budget signal 215-*a* is a repetition (e.g., SSB repetition, RMSI repetition) of the low link budget signal 210 but broadcast in accordance with a higher link budget. In other words, the network entity 105-*a* may broadcast the high link budget signal 215 (e.g., on demand) in accordance with the second link budget (e.g., high link budget) above the threshold link budget when (e.g., only when) there is a UE 115, such as the UE 115-*b*, that is not capable of receiving signals broadcast in accordance with the first link budget (e.g., low link budget) below the threshold link budget (e.g., a UE 115 that needs a high link budget).

For example, the network entity 105-*a* may broadcast (e.g., transmit) the low link budget signal 210 (e.g., a first broadcast signal) indicating the first information. In some cases, the first information may include configuration information associated with the network entity 105-*a* to enable UEs 115 to access or camp on the network entity 105-*a*. Additionally, the low link budget signal 210 may be associated with a first quantity of repetitions, a first aggregation level, a first MCS, or any combination thereof. That is, the first quantity of repetitions, the first aggregation level, the first MCS, or any combination thereof, may be selected such that the first information (e.g., low link budget signal 210) is broadcast in accordance with the first link budget below the threshold link budget.

Thus, UEs 115 may monitor for the low link budget signal 210. As described previously, the UE 115-*a* may receive the low link budget signal 210 based on the UE 115-*a* being within a threshold proximity of the network entity 105-*a*. Conversely, the UE 115-*b* may not receive the low link budget signal 210 based on the UE 115-*a* being beyond (e.g., outside of) the threshold proximity of the network entity 105-*a* (e.g., the low link budget signal 210 may be a more energy efficient signal but may not reach cell-edge UEs 115). Thus, the UE 115-*b* may transmit, based on failing to receive the low link budget signal 210, a request 220 (e.g., UL-WUS) for the network entity 105-*a* to transmit the first information as a high link budget signal 215 (e.g., as a high link budget signal 215-*a* in accordance with the second link budget above the threshold link budget). In other words, the UE 115-*a* may request (e.g., demand) for the network entity 105-*a* to transmit the same information included in the low link budget signal 210 via the high link budget signal 215-*a* (e.g., as a repetition transmitted in accordance with a higher link budget).

In some cases, the request 220 (e.g., UL-WUS) may indicate information associated with the request 220. For example, the request 220 may indicate an identity of the UE 115-*b*, an estimated link budget (e.g., for transmission of the high link budget signal 215-*a*), an estimated pathloss (e.g., for transmission of the high link budget signal 215-*a*), a suggested configuration (e.g., for transmission of the high link budget signal 215-*a*), or any combination thereof.

Additionally, or alternatively, the request 220 (e.g., UL-WUS requesting transmission of the first information, or RMSI, via a high link budget signal 215) may share one or more resources (e.g., common resources), configuration information (e.g., common configuration information), or both, with one or more other signals (e.g., physical random access channel (PRACH), RACH Msg-A, UL-WUS for other purposes, such as for on demand SIB1/SSB). In some other cases, the request 220 may be associated with one or more separate resources, separate configuration information, or both (e.g., the request 220 may be configured, or defined, to meet a threshold uplink link budget that supports repetition). In such case, the one or more separate resources, the separate configuration information, or both, may be indicated to the UE 115-*b* dynamically or semi-statically. For indication of the one or more separate resources, the separate configuration information, or both, semi-statically, the use of the one or more separate resources by the UE 115-*b* may be activated dynamically. In such cases, the activation may be explicit (e.g., via transmission of a control message) or implicitly (e.g., the high link budget signal 215-*a* may trigger activation of the one or more separate resources for the UE 115-*b*).

Additionally, or alternatively, the UE 115-*b* may be configured with (e.g., via configuration information in a control message or pre-configured) one or more conditions (e.g., criteria) associated with transmitting the request 220 (e.g., RMSI repetition request). For example, the one or more conditions may include the UE 115-*b* failing to acquire the first information (e.g., failing to receive the low link budget signal 210) within a configured (e.g., time) window, failing to acquire the first information after a threshold quantity (e.g., N) attempts (e.g., consecutive configured windows), or both.

Additionally, in some cases, the network entity 105-*a* may transmit (e.g., broadcast) a response, or acknowledgment (ACK), in response to the request 220. In such cases, the response may indicate whether the request 220 may be granted (e.g., or not). Additionally, or alternatively, the response may indicate one or more resources, configuration information, or both, associated with the high link budget signal 215-*a* (e.g., PDCCH/PDSCH). For example, the response may indicate one or more redundancy versions (RVs) associated with the high link budget signal 215-*a*. In some cases, the response (e.g., ACK) may be explicit (e.g., the network entity 105-*a* transmits a response message). In some other cases, the response may be implicit, such that the UE 115-*b* may monitor a set of pre-configured resources (e.g., using one or more pre-configured configurations) after sending the request 220 to acquire the high link budget signal 215-*a*. That is, the UE 115-*b* receiving the high link budget signal 215-*a* via the set of pre-configured resources may indicate granting of the request 220, while the UE 115-*b* failing to receive the high link budget signal 215-*a* via the set of pre-configured resources may indicate denial of the request 220.

Thus, the network entity 105-*a* may broadcast the high link budget signal 215-*a* (e.g., second broadcast signal) indicating the first information (e.g., based on receiving the request 220, based on transmitting the response, or both). In such cases, the high link budget signal 215-*a* may be associated with a second quantity of repetitions, a second aggregation level, a second MCS, or any combination thereof. That is, the second quantity of repetitions, the second aggregation level, the second MCS, or any combination thereof, may be selected such that the high link budget signal 215-*a* is broadcast in accordance with the second link budget above the threshold link budget. Additionally, or alternatively, the second quantity of repetitions may be greater than the first quantity of repetitions (e.g., activating more repetitions of the first information), the second aggregation level may be larger than the first aggregation level (e.g., increasing a quantity of control channel elements (CCEs) for transmission of the first information), the second MCS may be lower than the first MCS, or any combination thereof. As such, the UE 115-*b* may receive the first information via the high link budget signal 215-*a* (e.g., rather than the low link budget signal 210) based on the high link budget signal 215-*a* being a high link budget signal 215 capable of being received by cell-edge UEs 115.

In some cases, the network entity 105-*a* may broadcast (e.g., periodically, semi-persistently, dynamically), prior to the low link budget signal 210, a high link budget signal 215-*b* (e.g., third link budget signal, not including the first information). In such case, the high link budget signal 215-*b* may be a signal that may be successfully received by cell-edge UEs 115 with a high probability (e.g., above a threshold link budget probability, similar to the high link budget signal 215-*a*). That is, the high link budget signal 215-*a* may be broadcast in accordance with a third link budget (e.g., the same as or different than the second link budget) above the threshold link budget.

In some cases, the high link budget signal 215-*b* may be an SSB signal, an RMSI PDCCH signal, or both. Alternatively, the high link budget signal 215-*b* may be a different signal (e.g., separate signal, new signal) associated with a threshold (e.g., low) overhead. For example, the high link budget signal 215-*b* may occupy small resources, carry little to no information, or both, such as a beacon (e.g., preamble-type) signal. In such case, the network entity 105-*a* may signal, prior to transmission of the high link budget signal 215-*b* (e.g., via a control message), configuration information associated with the high link budget signal 215-*b*, one or more resources for communication of the high link budget signal 215-*b*, or both. Additionally, or alternatively, occasions of transmission (e.g., broadcasting) of the high link budget signal 215-*b* may correlate with transmission of one or more other signals (e.g., SSB, RMSI PDCCH, UL-WUS resources). For example, the high link budget signal 215-*b* may correlate to SSBs, such that the network entity 105-*a* transmitting an SSB in a third SSB occasion may indicate, to the UE 115-*b*, that the high link budget signal 215-*b* may be transmitted in a third high link budget signal occasion (e.g., of a set of high link budget signal occasions).

Additionally, or alternatively, regardless of link budget, on-demand transmission of the first information in accordance with modified transmission parameters may further be applied to other scenarios. That is, in some cases, the low link budget signal 210 may simply be a first broadcast signal transmitted (e.g., broadcast) in accordance with a first set of transmission parameters, and the high link budget signal 215-*a* may simply be a second broadcast signal transmitted on demand in accordance with a second set of transmission parameters, where at least one transmission parameter is different between the first set of transmission parameters and the second set of transmission parameters (e.g., it is possible that the low link budget signal 210 and the high link budget signal 215-*a* may be associated with a same link budget, but may be associated with one or more other transmission parameters that are different).

For example, the network entity 105-*a* may transmit the first broadcast signal (e.g., the low link budget signal 210, SIB1) indicating the first information in accordance with a first periodicity (e.g., first frequency) and a fourth link budget. In some cases, the first periodicity may be greater than a threshold periodicity (e.g., low frequency). However, a UE 115, such as the UE 115-*a*, the UE 115-*b*, or both, may be configured to monitor for the first broadcast signal during a time window that is smaller (e.g., shorter in time) than the first periodicity. For example, the network entity 105-*a* may transmit the first broadcast signal every 160 ms (e.g., or 320 ms) but the UE 115 may monitor for the first broadcast signal for 40 ms (e.g., or 80 ms). As such, in some cases, the UE 115 may monitor for the first broadcast signal during the time window but may fail to receive the first broadcast signal during the time window. As such, the UE 115 may transmit a request 220 for the network entity 105-*a* to transmit a second broadcast signal indicating the first information in accordance with a second periodicity, where the second periodicity is shorter (e.g., more frequent) than the first periodicity (e.g., request to transmit the first information more frequently). Thus, the network entity 105-*a* may transmit (e.g., broadcast or in a dedicated manner) the second broadcast signal in accordance with the second periodicity and the fourth link budget (e.g., same link budget) via a set of preconfigured occasions or via a set of dynamically indicated occasions.

In another example, a UE 115 may collect samples for one or more RVs based on the first broadcast signal but may still be unable to decode the first information. As such, the UE 115 may transmit a request 220 for the network entity 105-*a* to transmit a second broadcast signal indicating the first information in accordance with one or more requested RVs. That is, the request 220 may indicate the one or more RVs acquired by the UE 115, may indicate the one or more requested RVs, or both.

Though described in the context of SSB, SIB, RMSI, or any combination thereof, this is not to be regarded as a limitation of the present disclosure. In this regard, any type of broadcast signal (e.g., other SI (OSI), paging, or the like thereof) may be considered with regards to the techniques described herein. Further, the techniques described herein may be applied to all beams associated with the network entity 105-*a*, the UEs 115, or both, or a subset of the beams associated with the network entity 105-*a*, the UEs 115, or both.

Figure 3:
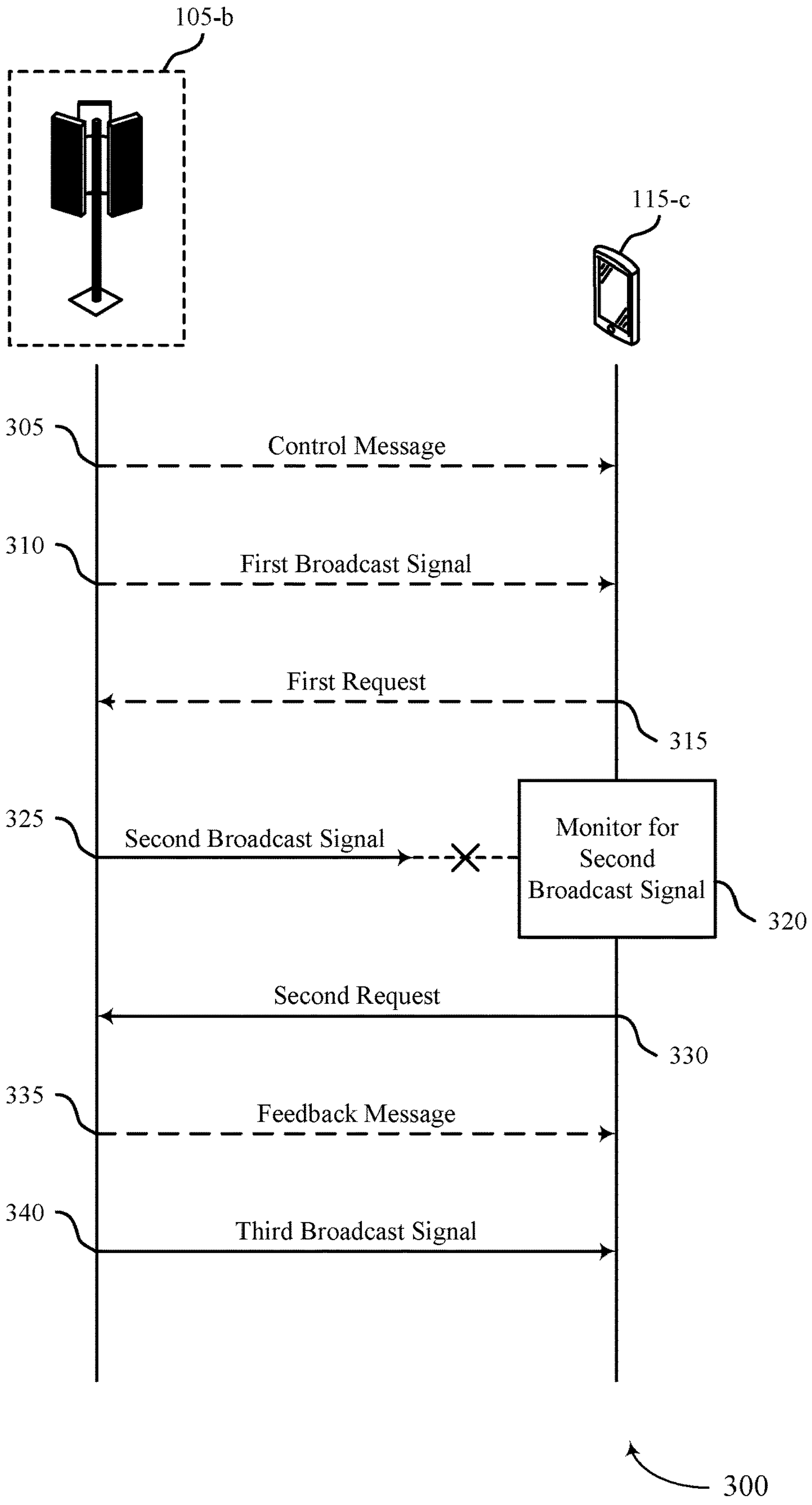
FIG. 3 shows an example of a process flow that supports techniques for adapting broadcast signals for network energy savings and coverage enhancement in accordance with one or more aspects of the present disclosure.

FIG. 3 shows an example of a process flow 300 that supports techniques for adapting broadcast signals for network energy savings and coverage enhancement in accordance with one or more aspects of the present disclosure. In some cases, the process flow 300 may implement or be implemented by aspects of the wireless communications system 100, the wireless communications system 200, or both. For example, the process flow 300 may include one or more UEs 115 (e.g., a UE 115-*c*) and one or more network entities 105 (e.g., a network entity 105-*b*), which may be examples of the corresponding devices as described herein.

In some cases, at 305, the network entity 105-*b* (e.g., cell) may transmit (e.g., broadcast to multiple UEs, transmit to the UE 115-*c*) a control message (e.g., periodically, semi-persistently, semi-statically, dynamically). In some cases, the control message may indicate first configuration information associated with a first broadcast signal (e.g., high link budget signal), one or more resources for reception of the first broadcast signal, or both. In such cases, the one or more resources for reception of the first broadcast signal may correspond to one or more resources for reception of the second broadcast signal (e.g., low link budget RMSI), one or more resources for transmission of a second request (e.g., high link budget RMSI request), or both.

Additionally, or alternatively, the control message may indicate a second configuration for transmission of a third broadcast signal (e.g., high link budget RMSI), the one or more resources for reception of the second broadcast signal (e.g., low link budget RMSI), the one or more resources for transmission of the second request (e.g., high link budget RMSI request), or any combination thereof. In such case, the second configuration, the one or more resources for transmission of the second request (e.g., high link budget RMSI request), or both, may be shared with one or more other signals.

Additionally, or alternatively, the first control message may indicate one or more conditions associated with transmitting the second request. For example, the one or more conditions may include failing to receive the second broadcast signal (e.g., low link budget RMSI) within a time window, failing to receive the second broadcast signal within one or more consecutive time windows, or both.

In some cases, at 310, the network entity 105-*b* may broadcast, prior to the time window, the first broadcast signal (e.g., high link budget signal, SSB, RMSI PDCCH). In such cases, the first broadcast signal may be associated with a first link budget that is greater than a threshold link budget. In some cases, the one or more resources for transmission of the second request (e.g., high link budget RMSI request) may be activated based on reception of the first broadcast signal.

In some examples, at 315, the UE 115-*c* may transmit, to the network entity 105-*b* prior to the time window, a first request (e.g., low link budget RMSI request) for transmission of the second broadcast signal (e.g., low link budget RMSI).

At 320, the UE 115-*c* may monitor, during the time window, for the second broadcast signal (e.g., low link budget RMSI) that includes first information. In some cases, the UE 115-*c* may monitor for the second broadcast signal based on transmitting the first request, based on receiving the first broadcast signal, or both.

At 325, the network entity 105-*b* may broadcast (e.g., output) the second broadcast signal (e.g., low link budget RMSI) in accordance with a first configuration associated with a first set of transmission parameters, where the first set of transmission parameters comprises a first transmission periodicity, a first link budget (e.g., less than the threshold link budget), or both. However, in some cases, the UE 115-*c* may fail to receive the second broadcast signal (e.g., due to proximity of the UE 115-*c* to the network entity 105-*b*, due to the time window being shorter than the first transmission periodicity, or both).

As such, at 330, the UE 115-*c* may transmit, to the network entity 105-*b* after the time window and based on the monitoring, the second request (e.g., high link budget RMSI request) for transmission of the third broadcast signal (e.g., high link budget RMSI) that includes the first information, wherein the request is that the third broadcast signal be broadcast in accordance with the second configuration associated with a second set of transmission parameters, wherein the second set of transmission parameters comprises a second transmission periodicity that is smaller than the first transmission periodicity, a second link budget that is greater than the first link budget (e.g., and greater than the threshold link budget), or both. In some cases, transmitting the second request may be based on satisfying at least one or the one or more conditions.

In some cases, the first link budget may be associated with a first quantity of repetitions, a first aggregation level, a first MCS, or any combination thereof, and the second link budget may be associated with a second quantity of repetitions, a second aggregation level, a second MCS, or any combination thereof. Additionally, the first quantity of repetitions may be less than the second quantity of repetitions, the first aggregation level may be greater than the second aggregation level, the first MCS may be greater than the second MCS, or any combination thereof.

Additionally, or alternatively, the second request may further indicate an identity of the UE, an estimated link budget, an estimated pathloss, a suggested configuration, one or more acquired RVs, one or more requested RVs, or any combination thereof.

In some cases, at 335, the network entity 105-*b* may transmit (e.g., broadcast or transmit directly) a feedback message in response to the second request, where the feedback message indicates whether the second request is granted. In some cases, the feedback may further indicate one or more resources for reception of the third broadcast signal (e.g., high link budget RMSI), the second configuration, or both, based on the feedback message indicating that the request is granted.

Thus, at 340, the network entity 105-*b* may broadcast the third broadcast signal (e.g., high link budget RMSI) based on receiving the second request, based on transmitting the feedback message, or both. As such, the UE 115-*c* may receive thew first information through receipt of the third broadcast signal (e.g., high link budget RMSI) instead of receipt of the second broadcast signal (e.g., low link budget RMSI) based on transmission of the second request.

Figure 4:
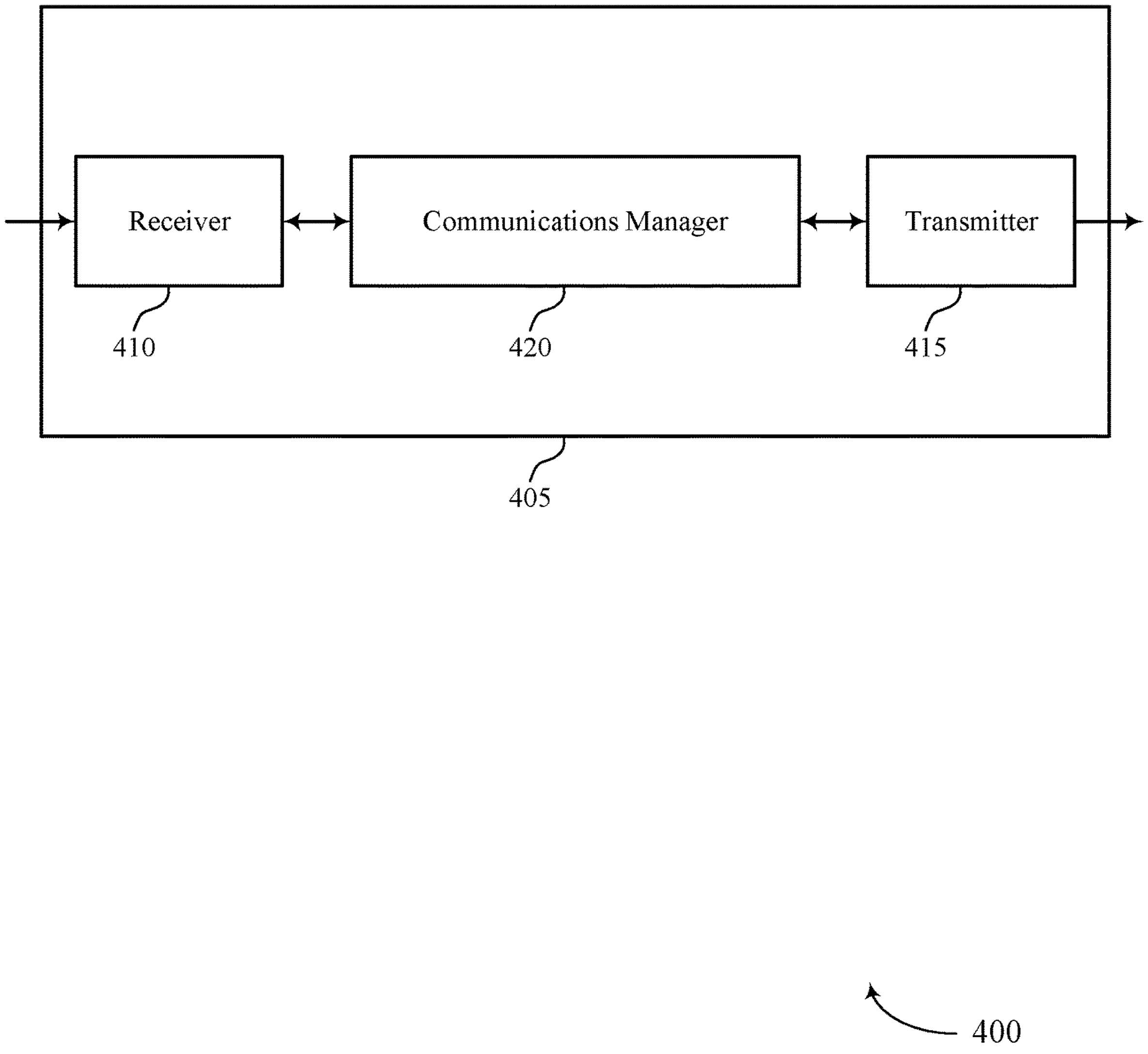
FIGS. 4 and 5 show block diagrams of devices that support techniques for adapting broadcast signals for network energy savings and coverage enhancement in accordance with one or more aspects of the present disclosure.

FIG. 4 shows a block diagram 400 of a device 405 that supports techniques for adapting broadcast signals for network energy savings and coverage enhancement in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for adapting broadcast signals for network energy savings and coverage enhancement). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for adapting broadcast signals for network energy savings and coverage enhancement). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations or components thereof may be examples of means for performing various aspects of techniques for adapting broadcast signals for network energy savings and coverage enhancement as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for monitoring, from a network entity and within a time window, for a first broadcast signal that includes first information, where the first broadcast signal is broadcast in accordance with a first configuration associated with a first set of transmission parameters, where the first set of transmission parameters includes a first transmission periodicity, a first link budget, or both. The communications manager 420 is capable of, configured to, or operable to support a means for transmitting, to the network entity after the time window and based on the monitoring, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both. The communications manager 420 is capable of, configured to, or operable to support a means for receiving the first information through receipt of the second broadcast signal instead of receipt of the first broadcast signal, based on transmission of the request.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for adapting broadcast signals based on requests from UEs 115, which may result in reduced processing, reduced power consumption, and more efficient utilization of communication resources, among other advantages.

Figure 5:
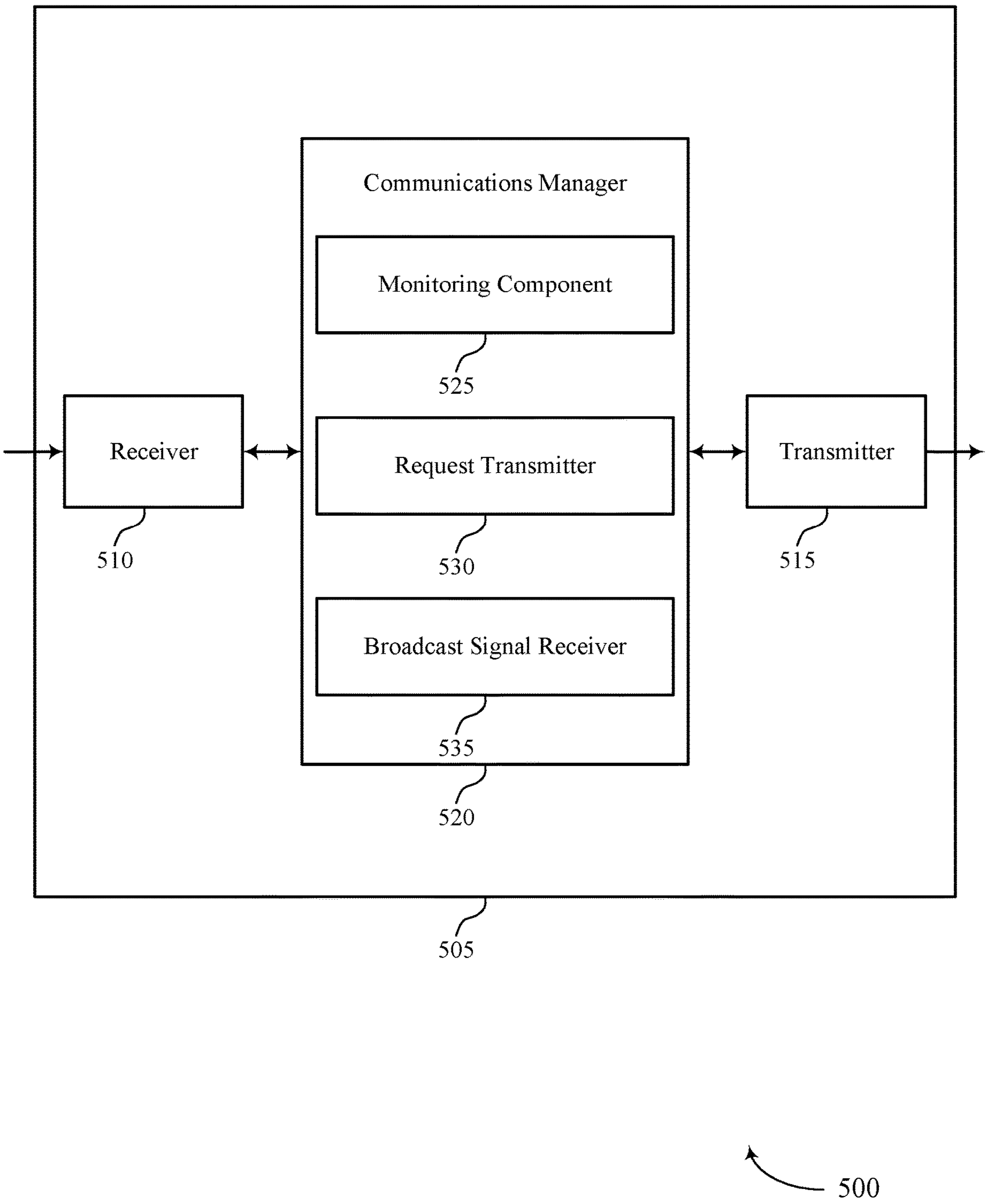

FIG. 5 shows a block diagram 500 of a device 505 that supports techniques for adapting broadcast signals for network energy savings and coverage enhancement in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for adapting broadcast signals for network energy savings and coverage enhancement). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for adapting broadcast signals for network energy savings and coverage enhancement). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for adapting broadcast signals for network energy savings and coverage enhancement as described herein. For example, the communications manager 520 may include a monitoring component 525, a request transmitter 530, a broadcast signal receiver 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The monitoring component 525 is capable of, configured to, or operable to support a means for monitoring, from a network entity and within a time window, for a first broadcast signal that includes first information, where the first broadcast signal is broadcast in accordance with a first configuration associated with a first set of transmission parameters, where the first set of transmission parameters includes a first transmission periodicity, a first link budget, or both. The request transmitter 530 is capable of, configured to, or operable to support a means for transmitting, to the network entity after the time window and based on the monitoring, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both. The broadcast signal receiver 535 is capable of, configured to, or operable to support a means for receiving the first information through receipt of the second broadcast signal instead of receipt of the first broadcast signal, based on transmission of the request.

Figure 6:
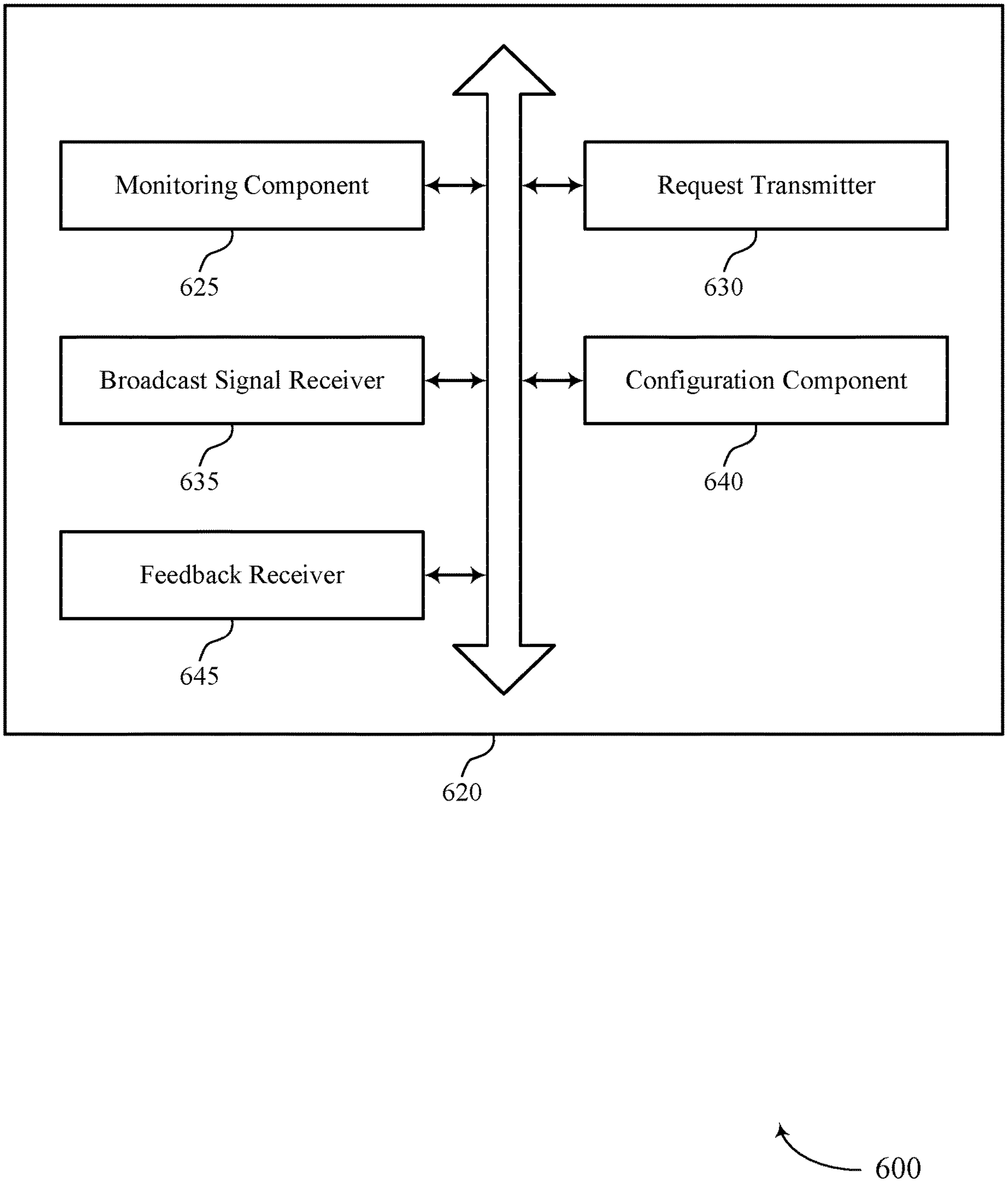
FIG. 6 shows a block diagram of a communications manager that supports techniques for adapting broadcast signals for network energy savings and coverage enhancement in accordance with one or more aspects of the present disclosure.

FIG. 6 shows a block diagram 600 of a communications manager 620 that supports techniques for adapting broadcast signals for network energy savings and coverage enhancement in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for adapting broadcast signals for network energy savings and coverage enhancement as described herein. For example, the communications manager 620 may include a monitoring component 625, a request transmitter 630, a broadcast signal receiver 635, a configuration component 640, a feedback receiver 645, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The monitoring component 625 is capable of, configured to, or operable to support a means for monitoring, from a network entity and within a time window, for a first broadcast signal that includes first information, where the first broadcast signal is broadcast in accordance with a first configuration associated with a first set of transmission parameters, where the first set of transmission parameters includes a first transmission periodicity, a first link budget, or both. The request transmitter 630 is capable of, configured to, or operable to support a means for transmitting, to the network entity after the time window and based on the monitoring, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both. The broadcast signal receiver 635 is capable of, configured to, or operable to support a means for receiving the first information through receipt of the second broadcast signal instead of receipt of the first broadcast signal, based on transmission of the request.

In some examples, the broadcast signal receiver 635 is capable of, configured to, or operable to support a means for receiving, prior to the time window, a third broadcast signal associated with a third link budget that is greater than at least the first link budget, where monitoring for the first broadcast signal is based on receiving the third broadcast signal.

In some examples, the third broadcast signal is a (SSB message or a RMSI PDCCH.

In some examples, the configuration component 640 is capable of, configured to, or operable to support a means for receiving a first control message indicating configuration information associated with the third broadcast signal, one or more resources for reception of the third broadcast signal, or both.

In some examples, the first control message is transmitted periodically, semi-persistently, or dynamically.

In some examples, the one or more resources for reception of the third broadcast signal correspond to one or more resources for reception of the first broadcast signal, one or more resources for transmission of the request, or both.

In some examples, one or more resources for transmission of the request are activated based on reception of the third broadcast signal.

In some examples, the second configuration, one or more resources associated with transmission of the request, or both, are shared with one or more additional signals.

In some examples, the configuration component 640 is capable of, configured to, or operable to support a means for receiving a first control message indicating the second configuration, one or more resources for transmission of the request, one or more resources for reception of the first broadcast signal, or any combination thereof.

In some examples, the first control message is transmitted dynamically or semi-statically.

In some examples, the configuration component 640 is capable of, configured to, or operable to support a means for receiving a first control message indication one or more conditions associated with transmitting the request, where transmitting the request is based on satisfying at least one of the one or more conditions.

In some examples, the one or more conditions includes failing to receive the first broadcast signal within the time window, failing to receive the first broadcast signal within one or more consecutive time windows, or both.

In some examples, the feedback receiver 645 is capable of, configured to, or operable to support a means for receiving a feedback message in response to the request, where the feedback message indicates whether the request is granted.

In some examples, the feedback message further indicates one or more resources for reception of the second broadcast signal, the second configuration, or both, based on the feedback message indicating that the request is granted.

In some examples, the request further indicates an identity of the UE, an estimated link budget, an estimated pathloss, a suggested configuration, one or more acquired RVs, one or more requested RVs, or any combination thereof.

In some examples, the request transmitter 630 is capable of, configured to, or operable to support a means for transmitting, prior to the time window, a second request for transmission of the first broadcast signal, where monitoring for the first broadcast signal is based on transmitting the second request.

In some examples, the first broadcast signal is transmitted in accordance with the first transmission periodicity.

In some examples, the first link budget is associated with a first quantity of repetitions, a first aggregation level, a first MCS, or any combination thereof. In some examples, the second link budget is associated with a second quantity of repetitions, a second aggregation level, a second MCS, or any combination thereof. In some examples, the first quantity of repetitions is less than the second quantity of repetitions, the first aggregation level is greater than the second aggregation level, the first MCS is greater than the second MCS, or any combination thereof.

Figure 7:
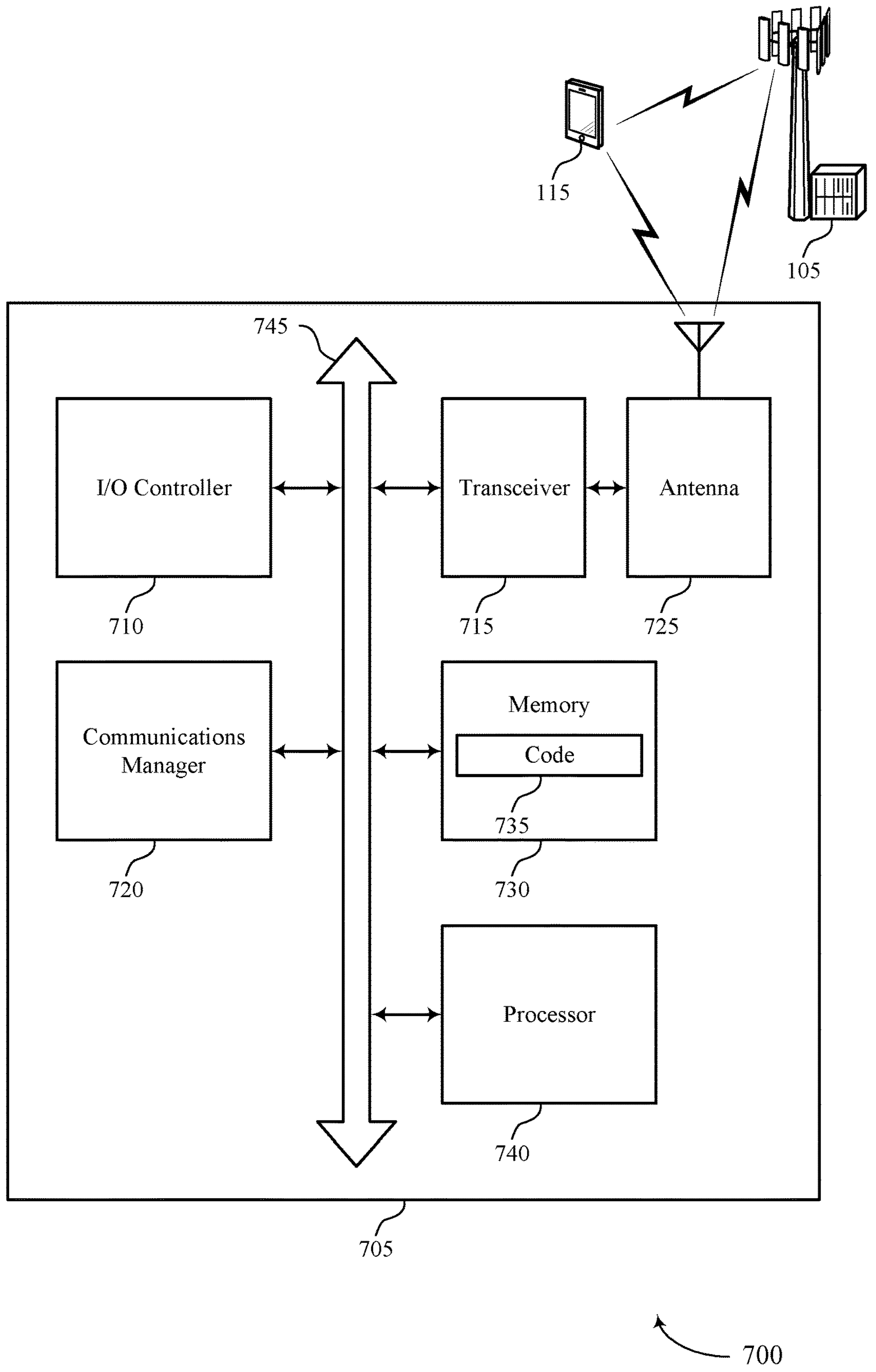
FIG. 7 shows a diagram of a system including a device that supports techniques for adapting broadcast signals for network energy savings and coverage enhancement in accordance with one or more aspects of the present disclosure.

FIG. 7 shows a diagram of a system 700 including a device 705 that supports techniques for adapting broadcast signals for network energy savings and coverage enhancement in accordance with one or more aspects of the present disclosure. The device 705 may be an example of or include components of a device 405, a device 505, or a UE 115 as described herein. The device 705 may communicate (e.g., wirelessly) with one or more other devices (e.g., network entities 105, UEs 115, or a combination thereof). The device 705 may include components for bi-directional voice and data communications including components for transmitting and receiving communications, such as a communications manager 720, an input/output (I/O) controller, such as an I/O controller 710, a transceiver 715, one or more antennas 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna. However, in some other cases, the device 705 may have more than one antenna, which may be capable of concurrently transmitting or receiving multiple wireless transmissions. The transceiver 715 may communicate bi-directionally via the one or more antennas 725 using wired or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable, or processor-executable code, such as the code 735. The code 735 may include instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may include, among other things, a basic I/O system (BIOS)

which may control basic hardware or software operation such as the interaction with peripheral components or devices.

The at least one processor 740 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting techniques for adapting broadcast signals for network energy savings and coverage enhancement). For example, the device 705 or a component of the device 705 may include at least one processor 740 and at least one memory 730 coupled with or to the at least one processor 740, the at least one processor 740 and the at least one memory 730 configured to perform various functions described herein.

In some examples, the at least one processor 740 may include multiple processors and the at least one memory 730 may include multiple memories. One or more of the multiple processors may be coupled with one or more of the multiple memories, which may, individually or collectively, be configured to perform various functions described herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code 735 (e.g., processor-executable code) stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for monitoring, from a network entity and within a time window, for a first broadcast signal that includes first information, where the first broadcast signal is broadcast in accordance with a first configuration associated with a first set of transmission parameters, where the first set of transmission parameters includes a first transmission periodicity, a first link budget, or both. The communications manager 720 is capable of, configured to, or operable to support a means for transmitting, to the network entity after the time window and based on the monitoring, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both. The communications manager 720 is capable of, configured to, or operable to support a means for receiving the first information through receipt of the second broadcast signal instead of receipt of the first broadcast signal, based on transmission of the request.

By including or configuring the communications manager 720 in accordance with examples as described herein, the device 705 may support techniques for adapting broadcast signals based on requests from UEs 115, which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of techniques for adapting broadcast signals for network energy savings and coverage enhancement as described herein, or the at least one processor 740 and the at least one memory 730 may be otherwise configured to, individually or collectively, perform or support such operations.

Figure 8:
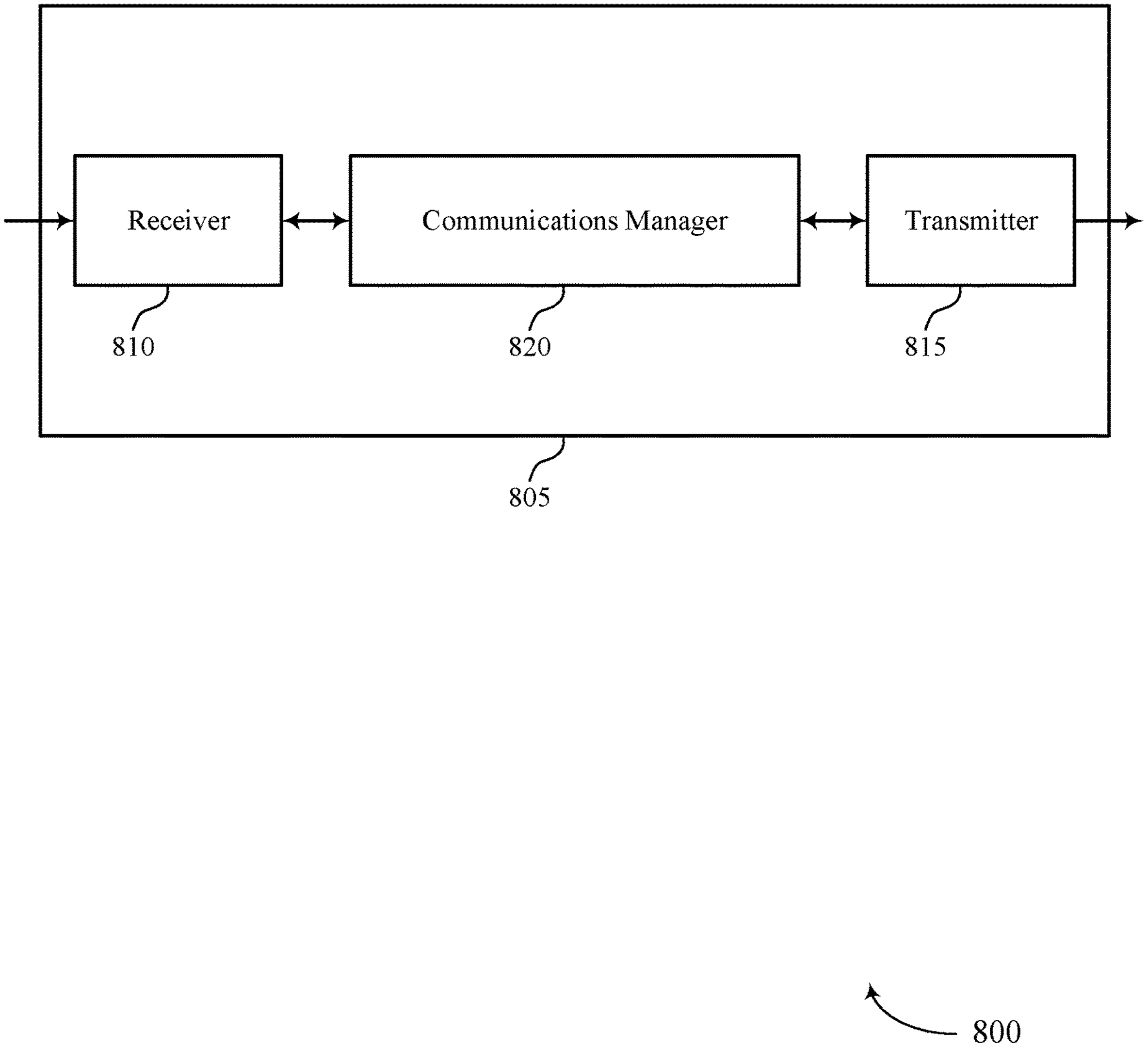
FIGS. 8 and 9 show block diagrams of devices that support techniques for adapting broadcast signals for network energy savings and coverage enhancement in accordance with one or more aspects of the present disclosure.

FIG. 8 shows a block diagram 800 of a device 805 that supports techniques for adapting broadcast signals for network energy savings and coverage enhancement in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations or components thereof may be examples of means for performing various aspects of techniques for adapting broadcast signals for network energy savings and coverage enhancement as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor (e.g., referred to as a processor-executable code). If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for outputting, during a time window, a first broadcast signal that includes first information, where the first broadcast signal is broadcast in accordance with a first configuration associated with a first set of transmission parameters, where the first set of transmission parameters includes a first transmission periodicity, a first link budget, or both. The communications manager 820 is capable of, configured to, or operable to support a means for obtaining, after the time window, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both. The communications manager 820 is capable of, configured to, or operable to support a means for outputting the first information through transmission of the second broadcast signal based on obtaining the request.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for adapting broadcast signals based on requests from UEs 115, which may result in reduced processing, reduced power consumption, and more efficient utilization of communication resources, among other advantages.

Figure 9:
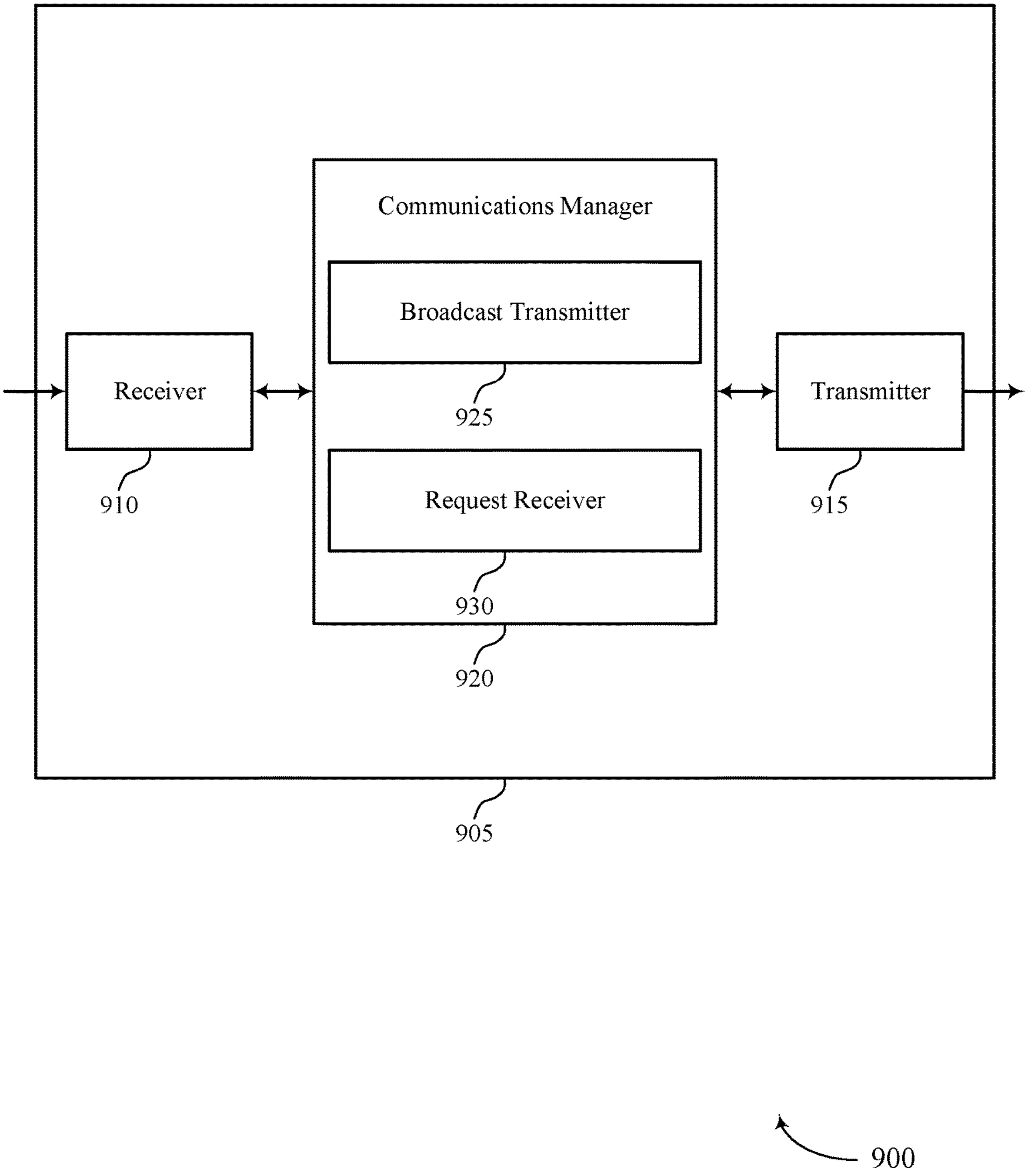

FIG. 9 shows a block diagram 900 of a device 905 that supports techniques for adapting broadcast signals for network energy savings and coverage enhancement in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for adapting broadcast signals for network energy savings and coverage enhancement as described herein. For example, the communications manager 920 may include a broadcast transmitter 925 a request receiver 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The broadcast transmitter 925 is capable of, configured to, or operable to support a means for outputting, during a time window, a first broadcast signal that includes first information, where the first broadcast signal is broadcast in accordance with a first configuration associated with a first set of transmission parameters, where the first set of transmission parameters includes a first transmission periodicity, a first link budget, or both. The request receiver 930 is capable of, configured to, or operable to support a means for obtaining, after the time window, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both. The broadcast transmitter 925 is capable of, configured to, or operable to support a means for outputting the first information through transmission of the second broadcast signal based on obtaining the request.

Figure 10:
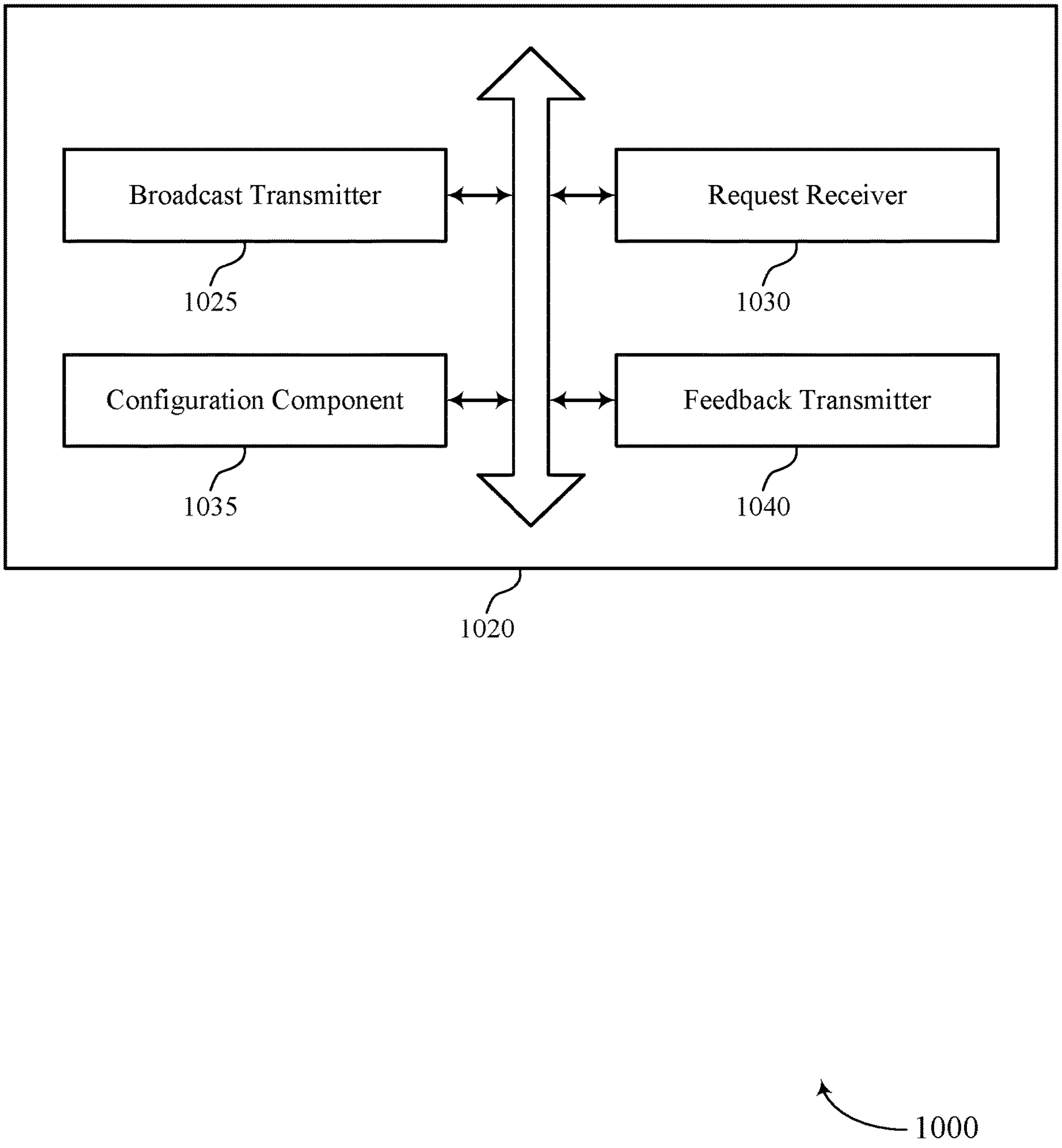
FIG. 10 shows a block diagram of a communications manager that supports techniques for adapting broadcast signals for network energy savings and coverage enhancement in accordance with one or more aspects of the present disclosure.

FIG. 10 shows a block diagram 1000 of a communications manager 1020 that supports techniques for adapting broadcast signals for network energy savings and coverage enhancement in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for adapting broadcast signals for network energy savings and coverage enhancement as described herein. For example, the communications manager 1020 may include a broadcast transmitter 1025, a request receiver 1030, a configuration component 1035, a feedback transmitter 1040, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The broadcast transmitter 1025 is capable of, configured to, or operable to support a means for outputting, during a time window, a first broadcast signal that includes first information, where the first broadcast signal is broadcast in accordance with a first configuration associated with a first set of transmission parameters, where the first set of transmission parameters includes a first transmission periodicity, a first link budget, or both. The request receiver 1030 is capable of, configured to, or operable to support a means for obtaining, after the time window, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both. In some examples, the broadcast transmitter 1025 is capable of, configured to, or operable to support a means for outputting the first information through transmission of the second broadcast signal based on obtaining the request.

In some examples, the broadcast transmitter 1025 is capable of, configured to, or operable to support a means for transmitting, prior to the time window, a third broadcast signal associated with a third link budget that is greater than at least the first link budget, where monitoring for the first broadcast signal is based on receiving the third broadcast signal.

In some examples, the third broadcast signal is a SSB message or a RMSI PDCCH.

In some examples, the configuration component 1035 is capable of, configured to, or operable to support a means for transmitting a first control message indicating configuration information associated with the third broadcast signal, one or more resources for reception of the third broadcast signal, or both.

In some examples, the first control message is transmitted periodically, semi-persistently, or dynamically.

In some examples, the one or more resources for reception of the third broadcast signal correspond to one or more resources for reception of the first broadcast signal, one or more resources for transmission of the request, or both.

In some examples, one or more resources for transmission of the request are activated based on transmission of the third broadcast signal.

In some examples, the second configuration, one or more resources associated with transmission of the request, or both, are shared with one or more additional signals.

In some examples, the configuration component 1035 is capable of, configured to, or operable to support a means for transmitting a first control message indicating the second configuration, one or more resources for transmission of the request, one or more resources for reception of the first broadcast signal, or any combination thereof.

In some examples, the first control message is transmitted dynamically or semi-statically.

In some examples, the configuration component 1035 is capable of, configured to, or operable to support a means for transmitting a first control message indication one or more conditions associated with transmitting the request, where receiving the request is based on satisfying at least one of the one or more conditions.

In some examples, the one or more conditions includes a UE failing to receive the first broadcast signal within the time window, the UE failing to receive the first broadcast signal within one or more consecutive time windows, or both.

In some examples, the feedback transmitter 1040 is capable of, configured to, or operable to support a means for transmitting a feedback message in response to the request, where the feedback message indicates whether the request is granted.

In some examples, the feedback message further indicates one or more resources for reception of the second broadcast signal, the second configuration, or both, based on the feedback message indicating that the request is granted.

In some examples, the request further indicates an identity of a UE, an estimated link budget, an estimated pathloss, a suggested configuration, one or more acquired RVs, one or more requested RVs, or any combination thereof.

In some examples, the request receiver 1030 is capable of, configured to, or operable to support a means for receiving, prior to the time window, a second request for transmission of the first broadcast signal, where monitoring for the first broadcast signal is based on transmitting the second request.

In some examples, the first broadcast signal is transmitted in accordance with the first transmission periodicity.

In some examples, the first link budget is associated with a first quantity of repetitions, a first aggregation level, a first MCS, or any combination thereof. In some examples, the second link budget is associated with a second quantity of repetitions, a second aggregation level, a second MCS, or any combination thereof. In some examples, the first quantity of repetitions is less than the second quantity of repetitions, the first aggregation level is greater than the second aggregation level, the first MCS is greater than the second MCS, or any combination thereof.

Figure 11:
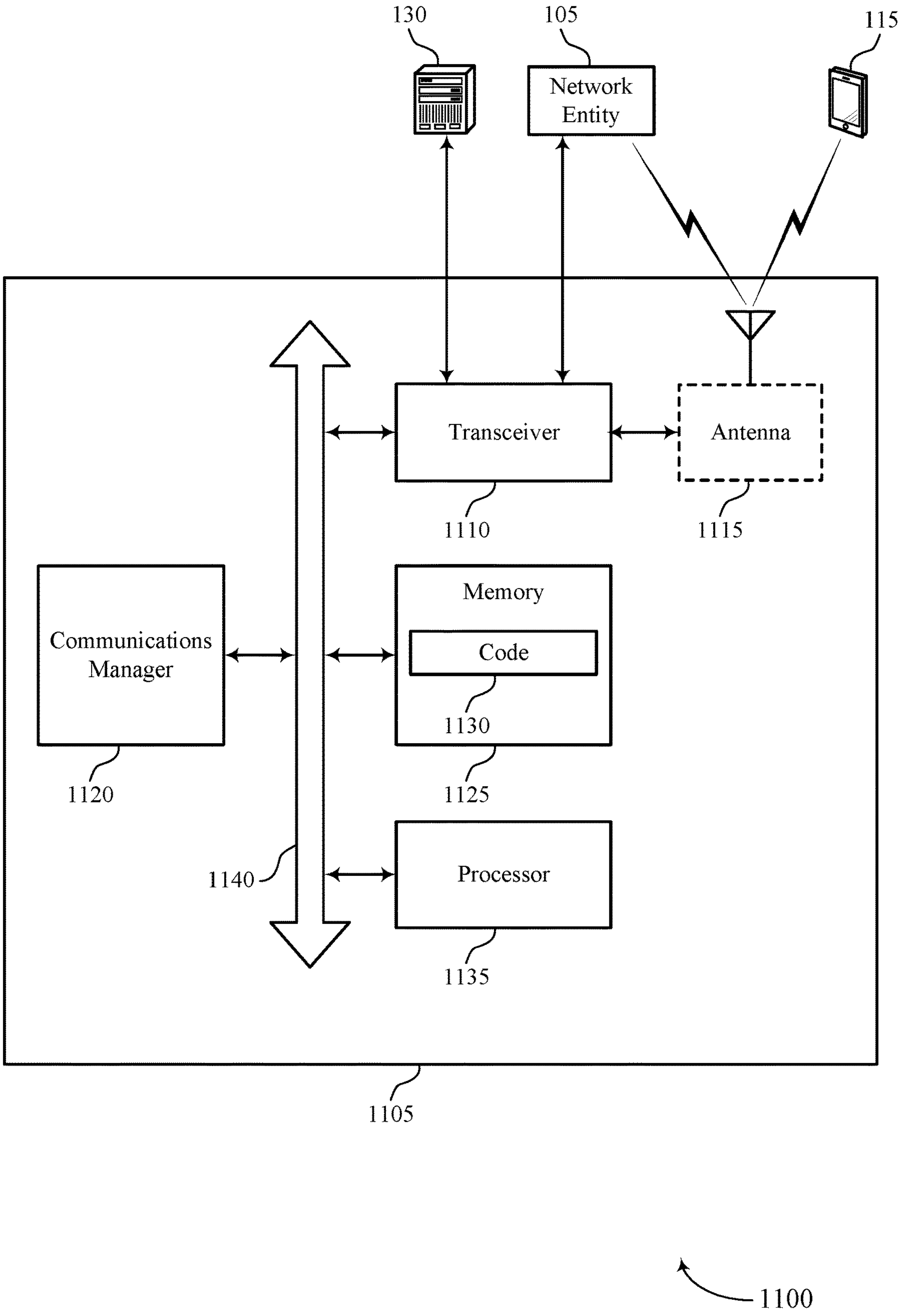
FIG. 11 shows a diagram of a system including a device that supports techniques for adapting broadcast signals for network energy savings and coverage enhancement in accordance with one or more aspects of the present disclosure.

FIG. 11 shows a diagram of a system 1100 including a device 1105 that supports techniques for adapting broadcast signals for network energy savings and coverage enhancement in accordance with one or more aspects of the present disclosure. The device 1105 may be an example of or include components of a device 805, a device 905, or a network entity 105 as described herein. The device 1105 may communicate with other network devices or network equipment such as one or more of the network entities 105, UEs 115, or any combination thereof. The communications may include communications over one or more wired interfaces, over one or more wireless interfaces, or any combination thereof. The device 1105 may include components that support outputting and obtaining communications, such as a communications manager 1120, a transceiver 1110, one or more antennas 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., communication link(s) 125, backhaul communication link(s) 120, a midhaul communication link 162, a fronthaul communication link 168).

The at least one memory 1125 may include RAM, ROM, or any combination thereof. The at least one memory 1125 may store computer-readable, computer-executable, or processor-executable code, such as the code 1130. The code 1130 may include instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may include, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting techniques for adapting broadcast signals for network energy savings and coverage enhancement). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125).

In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. For example, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with one or more other network entities 105, and may include a controller or scheduler for controlling communications with UEs 115 (e.g., in cooperation with the one or more other network devices). In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for outputting, during a time window, a first broadcast signal that includes first information, where the first broadcast signal is broadcast in accordance with a first configuration associated with a first set of transmission parameters, where the first set of transmission parameters includes a first transmission periodicity, a first link budget, or both. The communications manager 1120 is capable of, configured to, or operable to support a means for obtaining, after the time window, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both. The communications manager 1120 is capable of, configured to, or operable to support a means for outputting the first information through transmission of the second broadcast signal based on obtaining the request.

By including or configuring the communications manager 1120 in accordance with examples as described herein, the device 1105 may support techniques for adapting broadcast signals based on requests from UEs 115, which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of techniques for adapting broadcast signals for network energy savings and coverage enhancement as described herein, or the at least one processor 1135 and the at least one memory 1125 may be otherwise configured to, individually or collectively, perform or support such operations.

FIG. 12 shows a flowchart illustrating a method 1200 that supports techniques for adapting broadcast signals for network energy savings and coverage enhancement in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include monitoring, from a network entity and within a time window, for a first broadcast signal that includes first information, where the first broadcast signal is broadcast in accordance with a first configuration associated with a first set of transmission parameters, where the first set of transmission parameters includes a first transmission periodicity, a first link budget, or both. The operations of 1205 may be performed in accordance with examples as disclosed herein. In some examples, aspects of the operations of 1205 may be performed by a monitoring component 625 as described with reference to FIG. 6.

At 1210, the method may include transmitting, to the network entity after the time window and based on the monitoring, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both. The operations of 1210 may be performed in accordance with examples as disclosed herein. In some examples, aspects of the operations of 1210 may be performed by a request transmitter 630 as described with reference to FIG. 6.

At 1215, the method may include receiving the first information through receipt of the second broadcast signal instead of receipt of the first broadcast signal, based on transmission of the request. The operations of 1215 may be performed in accordance with examples as disclosed herein. In some examples, aspects of the operations of 1215 may be performed by a broadcast signal receiver 635 as described with reference to FIG. 6.

FIG. 13 shows a flowchart illustrating a method 1300 that supports techniques for adapting broadcast signals for network energy savings and coverage enhancement in accordance with one or more aspects of the present disclosure. The operations of the method 1300 may be implemented by a network entity or its components as described herein. For example, the operations of the method 1300 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1305, the method may include outputting, during a time window, a first broadcast signal that includes first information, where the first broadcast signal is broadcast in accordance with a first configuration associated with a first set of transmission parameters, where the first set of transmission parameters includes a first transmission periodicity, a first link budget, or both. The operations of 1305 may be performed in accordance with examples as disclosed herein. In some examples, aspects of the operations of 1305 may be performed by a broadcast transmitter 1025 as described with reference to FIG. 10.

At 1310, the method may include obtaining, after the time window, a request for transmission of a second broadcast signal that includes the first information, where the request is that the second broadcast signal be broadcast in accordance with a second configuration associated with a second set of transmission parameters, where the second set of transmission parameters includes a second transmission periodicity that is smaller than the first transmission periodicity, a second link budget that is greater than the first link budget, or both. The operations of 1310 may be performed in accordance with examples as disclosed herein. In some examples, aspects of the operations of 1310 may be performed by a request receiver 1030 as described with reference to FIG. 10.

At 1315, the method may include outputting the first information through transmission of the second broadcast signal based on obtaining the request. The operations of 1315 may be performed in accordance with examples as disclosed herein. In some examples, aspects of the operations of 1315 may be performed by a broadcast transmitter 1025 as described with reference to FIG. 10.

The following provides an overview of aspects of the present disclosure:

Aspect 1: A method for wireless communications at a UE, comprising: monitoring, from a network entity and within a time window, for a first broadcast signal that includes first information, wherein the first broadcast signal is broadcast in accordance with a first configuration associated with a first set of transmission parameters, wherein the first set of transmission parameters comprises a first transmission periodicity, a first link budget, or both; transmitting, to the network entity after the time window and based at least in part on the monitoring, a request for transmission of a second broadcast signal that includes the first information, wherein the request is that the second broadcast signal be broadcast in accordance with a second configuration associated with a second set of transmission parameters, wherein the second set of transmission parameters comprises a second transmission periodicity that is smaller than the first transmission periodicity, a second link budget that is greater than the first link budget, or both; and receiving the first information through receipt of the second broadcast signal instead of receipt of the first broadcast signal, based at least in part on transmission of the request.

Aspect 2: The method of aspect 1, further comprising: receiving, prior to the time window, a third broadcast signal associated with a third link budget that is greater than at least the first link budget, wherein monitoring for the first broadcast signal is based at least in part on receiving the third broadcast signal.

Aspect 3: The method of aspect 2, wherein the third broadcast signal is a SSB message or a RMSI PDCCH.

Aspect 4: The method of any of aspects 2 through 3, further comprising: receiving a first control message indicating configuration information associated with the third broadcast signal, one or more resources for reception of the third broadcast signal, or both.

Aspect 5: The method of aspect 4, wherein the first control message is transmitted periodically, semi-persistently, or dynamically.

Aspect 6: The method of any of aspects 4 through 5, wherein the one or more resources for reception of the third broadcast signal correspond to one or more resources for reception of the first broadcast signal, one or more resources for transmission of the request, or both.

Aspect 7: The method of any of aspects 2 through 6, wherein one or more resources for transmission of the request are activated based at least in part on reception of the third broadcast signal.

Aspect 8: The method of any of aspects 1 through 7, wherein the second configuration, one or more resources associated with transmission of the request, or both, are shared with one or more additional signals.

Aspect 9: The method of any of aspects 1 through 8, further comprising: receiving a first control message indicating the second configuration, one or more resources for transmission of the request, one or more resources for reception of the first broadcast signal, or any combination thereof.

Aspect 10: The method of aspect 9, wherein the first control message is transmitted dynamically or semi-statically.

Aspect 11: The method of any of aspects 1 through 10, further comprising: receiving a first control message indication one or more conditions associated with transmitting the request, wherein transmitting the request is based at least in part on satisfying at least one of the one or more conditions.

Aspect 12: The method of aspect 11, wherein the one or more conditions comprises failing to receive the first broadcast signal within the time window, failing to receive the first broadcast signal within one or more consecutive time time windows, or both.

Aspect 13: The method of any of aspects 1 through 12, further comprising: receiving a feedback message in response to the request, wherein the feedback message indicates whether the request is granted.

Aspect 14: The method of aspect 13, wherein the feedback message further indicates one or more resources for reception of the second broadcast signal, the second configuration, or both, based at least in part on the request indicating that the request is granted.

Aspect 15: The method of any of aspects 1 through 14, wherein the request further indicates an identity of the UE, an estimated link budget, an estimated pathloss, a suggested configuration, one or more acquired RVs, one or more requested RVs, or any combination thereof.

Aspect 16: The method of any of aspects 1 through 15, further comprising: transmitting, prior to the time window, a second request for transmission of the first broadcast signal, wherein monitoring for the first broadcast signal is based at least in part on transmitting the second request.

Aspect 17: The method of any of aspects 1 through 16, wherein the first broadcast signal is transmitted in accordance with the first transmission periodicity.

Aspect 18: The method of any of aspects 1 through 17, wherein the first link budget is associated with a first quantity of repetitions, a first aggregation level, a first MCS, or any combination thereof, the second link budget is associated with a second quantity of repetitions, a second aggregation level, a second MCS, or any combination thereof, and the first quantity of repetitions is less than the second quantity of repetitions, the first aggregation level is greater than the second aggregation level, the first MCS is greater than the second MCS, or any combination thereof.

Aspect 19: A method for wireless communications at a network entity, comprising: outputting, during a time window, a first broadcast signal that includes first information, wherein the first broadcast signal is broadcast in accordance with a first configuration associated with a first set of transmission parameters, wherein the first set of transmission parameters comprises a first transmission periodicity, a first link budget, or both; obtaining, after the time window, a request for transmission of a second broadcast signal that includes the first information, wherein the request is that the second broadcast signal be broadcast in accordance with a second configuration associated with a second set of transmission parameters, wherein the second set of transmission parameters comprises a second transmission periodicity that is smaller than the first transmission periodicity, a second link budget that is greater than the first link budget, or both; and outputting the first information through transmission of the second broadcast signal based at least in part on obtaining the request.

Aspect 20: The method of aspect 19, further comprising: transmitting, prior to the time window, a third broadcast signal associated with a third link budget that is greater than at least the first link budget, wherein monitoring for the first broadcast signal is based at least in part on receiving the third broadcast signal.

Aspect 21: The method of aspect 20, wherein the third broadcast signal is a SSB message or a RMSI PDCCH.

Aspect 22: The method of any of aspects 20 through 21, further comprising: transmitting a first control message indicating configuration information associated with the third broadcast signal, one or more resources for reception of the third broadcast signal, or both.

Aspect 23: The method of aspect 22, wherein the first control message is transmitted periodically, semi-persistently, or dynamically.

Aspect 24: The method of any of aspects 22 through 23, wherein the one or more resources for reception of the third broadcast signal correspond to one or more resources for reception of the first broadcast signal, one or more resources for transmission of the request, or both.

Aspect 25: The method of any of aspects 20 through 24, wherein one or more resources for transmission of the request are activated based at least in part on transmission of the third broadcast signal.

Aspect 26: The method of any of aspects 19 through 25, wherein the second configuration, one or more resources associated with transmission of the request, or both, are shared with one or more additional signals.

Aspect 27: The method of any of aspects 19 through 26, further comprising: transmitting a first control message indicating the second configuration, one or more resources for transmission of the request, one or more resources for reception of the first broadcast signal, or any combination thereof.

Aspect 28: The method of aspect 27, wherein the first control message is transmitted dynamically or semi-statically.

Aspect 29: The method of any of aspects 19 through 28, further comprising: transmitting a first control message indication one or more conditions associated with transmitting the request, wherein receiving the request is based at least in part on satisfying at least one of the one or more conditions.

Aspect 30: The method of aspect 29, wherein the one or more conditions comprises a UE failing to receive the first broadcast signal within the time window, the UE failing to receive the first broadcast signal within one or more consecutive time time windows, or both.

Aspect 31: The method of any of aspects 19 through 30, further comprising: transmitting a feedback message in response to the request, wherein the feedback message indicates whether the request is granted.

Aspect 32: The method of aspect 31, wherein the feedback message further indicates one or more resources for reception of the second broadcast signal, the second configuration, or both, based at least in part on the request indicating that the request is granted.

Aspect 33: The method of any of aspects 19 through 32, wherein the request further indicates an identity of a UE, an estimated link budget, an estimated pathloss, a suggested configuration, one or more acquired RVs, one or more requested RVs, or any combination thereof.

Aspect 34: The method of any of aspects 19 through 33, further comprising: receiving, prior to the time window, a second request for transmission of the first broadcast signal, wherein monitoring for the first broadcast signal is based at least in part on transmitting the second request.

Aspect 35: The method of any of aspects 19 through 34, wherein the first broadcast signal is transmitted in accordance with the first transmission periodicity.

Aspect 36: The method of any of aspects 19 through 35, wherein the first link budget is associated with a first quantity of repetitions, a first aggregation level, a first MCS, or any combination thereof, the second link budget is associated with a second quantity of repetitions, a second aggregation level, a second MCS, or any combination thereof, and the first quantity of repetitions is less than the second quantity of repetitions, the first aggregation level is greater than the second aggregation level, the first MCS is greater than the second MCS, or any combination thereof.

Aspect 37: A UE for wireless communications, comprising one or more memories storing processor-executable code, and one or more processors coupled with the one or more memories and individually or collectively operable to execute the code to cause the UE to perform a method of any of aspects 1 through 18.

Aspect 38: A UE for wireless communications, comprising at least one means for performing a method of any of aspects 1 through 18.

Aspect 39: A non-transitory computer-readable medium storing code for wireless communications, the code comprising instructions executable by one or more processors to perform a method of any of aspects 1 through 18.

Aspect 40: A network entity for wireless communications, comprising one or more memories storing processor-executable code, and one or more processors coupled with the one or more memories and individually or collectively operable to execute the code to cause the network entity to perform a method of any of aspects 19 through 36.

Aspect 41: A network entity for wireless communications, comprising at least one means for performing a method of any of aspects 19 through 36.

Aspect 42: A non-transitory computer-readable medium storing code for wireless communications, the code comprising instructions executable by one or more processors to perform a method of any of aspects 19 through 36.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

monitor, from a network entity and within a time window, for a first broadcast signal that includes first information, wherein the first broadcast signal is broadcast in accordance with a first configuration associated with a first set of transmission parameters, wherein the first set of transmission parameters comprises a first transmission periodicity, a first link budget, or both;

transmit, to the network entity after the time window and based at least in part on the monitoring, a request for transmission of a second broadcast signal that includes the first information, wherein the request is that the second broadcast signal be broadcast in accordance with a second configuration associated with a second set of transmission parameters, wherein the second set of transmission parameters comprises a second transmission periodicity that is smaller than the first transmission periodicity, a second link budget that is greater than the first link budget, or both; and receive the first information through receipt of the second broadcast signal instead of receipt of the first broadcast signal, based at least in part on transmission of the request.

2. The UE of claim 1, wherein the one or more processors are individually or collectively further operable to execute the code to cause the UE to:

receive, prior to the time window, a third broadcast signal associated with a third link budget that is greater than at least the first link budget, wherein monitoring for the first broadcast signal is based at least in part on receiving the third broadcast signal.

3. The UE of claim 2, wherein the one or more processors are individually or collectively further operable to execute the code to cause the UE to:

receive a first control message indicating configuration information associated with the third broadcast signal, one or more resources for reception of the third broadcast signal, or both.

4. The UE of claim 1, wherein the second configuration, one or more resources associated with transmission of the request, or both, are shared with one or more additional signals.

5. The UE of claim 1, wherein the one or more processors are individually or collectively further operable to execute the code to cause the UE to:

receive a first control message indicating the second configuration, one or more resources for transmission of the request, one or more resources for reception of the first broadcast signal, or any combination thereof.

6. The UE of claim 1, wherein the one or more processors are individually or collectively further operable to execute the code to cause the UE to:

receive a first control message indication one or more conditions associated with transmitting the request, wherein transmitting the request is based at least in part on satisfying at least one of the one or more conditions.

7. The UE of claim 6, wherein the one or more conditions comprises failing to receive the first broadcast signal within the time window, failing to receive the first broadcast signal within one or more consecutive time windows, or both.

8. The UE of claim 1, wherein the one or more processors are individually or collectively further operable to execute the code to cause the UE to:

receive a feedback message in response to the request, wherein the feedback message indicates whether the request is granted.

9. The UE of claim 8, wherein the feedback message further indicates one or more resources for reception of the second broadcast signal, the second configuration, or both, based at least in part on the feedback message indicating that the request is granted.

10. The UE of claim 1, wherein the request further indicates an identity of the UE, an estimated link budget, an estimated pathloss, a suggested configuration, one or more acquired redundancy versions (RVs), one or more requested RVs, or any combination thereof.

11. A network entity, comprising:

one or more memories storing processor-executable code; and one or more processors coupled with the one or more memories and individually or collectively operable to execute the code to cause the network entity to:

output, during a time window, a first broadcast signal that includes first information, wherein the first broadcast signal is broadcast in accordance with a first configuration associated with a first set of transmission parameters, wherein the first set of transmission parameters comprises a first transmission periodicity, a first link budget, or both;

obtain, after the time window, a request for transmission of a second broadcast signal that includes the first information, wherein the request is that the second broadcast signal be broadcast in accordance with a second configuration associated with a second set of transmission parameters, wherein the second set of transmission parameters comprises a second transmission periodicity that is smaller than the first transmission periodicity, a second link budget that is greater than the first link budget, or both; and output the first information through transmission of the second broadcast signal based at least in part on obtaining the request.

12. The network entity of claim 11, wherein the one or more processors are individually or collectively further operable to execute the code to cause the network entity to:

transmit, prior to the time window, a third broadcast signal associated with a third link budget that is greater than at least the first link budget, wherein monitoring for the first broadcast signal is based at least in part on receiving the third broadcast signal.

13. The network entity of claim 12, wherein the one or more processors are individually or collectively further operable to execute the code to cause the network entity to:

transmit a first control message indicating configuration information associated with the third broadcast signal, one or more resources for reception of the third broadcast signal, or both.

14. The network entity of claim 11, wherein the second configuration, one or more resources associated with transmission of the request, or both, are shared with one or more additional signals.

15. The network entity of claim 11, wherein the one or more processors are individually or collectively further operable to execute the code to cause the network entity to:

transmit a first control message indicating the second configuration, one or more resources for transmission of the request, one or more resources for reception of the first broadcast signal, or any combination thereof.

16. The network entity of claim 11, wherein the one or more processors are individually or collectively further operable to execute the code to cause the network entity to:

transmit a first control message indication one or more conditions associated with transmitting the request, wherein receiving the request is based at least in part on satisfying at least one of the one or more conditions.

17. The network entity of claim 16, wherein the one or more conditions comprises a user equipment (UE) failing to receive the first broadcast signal within the time window, the UE failing to receive the first broadcast signal within one or more consecutive time windows, or both.

18. The network entity of claim 11, wherein the one or more processors are individually or collectively further operable to execute the code to cause the network entity to:

transmit a feedback message in response to the request, wherein the feedback message indicates whether the request is granted.

19. The network entity of claim 11, wherein the request further indicates an identity of a user equipment (UE), an estimated link budget, an estimated pathloss, a suggested configuration, one or more acquired redundancy versions (RVs), one or more requested RVs, or any combination thereof.

20. A method for wireless communications at a user equipment (UE), comprising:

monitoring, from a network entity and within a time window, for a first broadcast signal that includes first information, wherein the first broadcast signal is broadcast in accordance with a first configuration associated with a first set of transmission parameters, wherein the first set of transmission parameters comprises a first transmission periodicity, a first link budget, or both;

transmitting, to the network entity after the time window and based at least in part on the monitoring, a request for transmission of a second broadcast signal that includes the first information, wherein the request is that the second broadcast signal be broadcast in accordance with a second configuration associated with a second set of transmission parameters, wherein the second set of transmission parameters comprises a second transmission periodicity that is smaller than the first transmission periodicity, a second link budget that is greater than the first link budget, or both; and receiving the first information through receipt of the second broadcast signal instead of receipt of the first broadcast signal, based at least in part on transmission of the request.

* * * * *